US006724859B1

(12) United States Patent
Galli

(10) Patent No.: US 6,724,859 B1
(45) Date of Patent: Apr. 20, 2004

(54) METHOD FOR DETERMINING SUBSCRIBER LOOP MAKE-UP BY SUBTRACTING CALCULATED SIGNALS

(75) Inventor: Stefano Galli, Morristown, NJ (US)

(73) Assignee: Telcordia Technologies, Inc., Piscataway, NJ (US)

(*) Notice: Subject to any disclaimer, the term of this patent is extended or adjusted under 35 U.S.C. 154(b) by 107 days.

(21) Appl. No.: 09/676,881

(22) Filed: Sep. 29, 2000

Related U.S. Application Data
(60) Provisional application No. 60/157,094, filed on Sep. 30, 1999.

(51) Int. Cl.[7] .......................... G01R 31/08; H04M 3/26
(52) U.S. Cl. ..................................... 379/1.04; 324/533
(58) Field of Search ............................... 379/26, 29.01, 379/30, 1.04, 28; 324/533, 523

(56) References Cited

U.S. PATENT DOCUMENTS

| | | | |
|---|---|---|---|
| 3,634,755 A | 1/1972 | Nicolson | 324/57 R |
| 3,903,477 A | 9/1975 | Cronson et al. | 324/58.5 A |
| 4,063,160 A | * 12/1977 | Lanz et al. | |
| 4,446,341 A | 5/1984 | Rubin | 179/175.2 R |
| 4,459,437 A | 7/1984 | Gabry et al. | 179/175.3 F |
| 4,550,223 A | 10/1985 | Poitevin | 179/175.3 F |
| 4,620,069 A | 10/1986 | Godwin et al. | 179/175.3 R |
| 4,710,949 A | 12/1987 | Ahuja | 379/26 |
| 4,970,466 A | 11/1990 | Bolles et al. | 324/533 |
| 5,083,086 A | 1/1992 | Steiner | 324/533 |
| 5,128,619 A | 7/1992 | Bjork et al. | 324/533 |
| 5,343,461 A | 8/1994 | Barton et al. | 370/13 |
| 5,369,366 A | 11/1994 | Piesinger | 324/533 |
| 5,461,318 A | 10/1995 | Borchert et al. | 324/533 |
| 5,465,287 A | 11/1995 | Egozi | 379/5 |
| 5,481,195 A | 1/1996 | Meyer | 324/534 |
| 5,629,628 A | 5/1997 | Hinds et al. | 324/628 |
| 5,699,402 A | 12/1997 | Bauer et al. | 379/26 |
| 5,956,386 A | 9/1999 | Miller | 379/27 |
| 5,978,449 A | 11/1999 | Needle | 379/6 |
| 5,982,412 A | 11/1999 | Nulty | 348/6 |
| 6,091,713 A | 7/2000 | Lechleider et al. | 370/248 |

FOREIGN PATENT DOCUMENTS

| | | |
|---|---|---|
| WO | WO 00-27134 | 5/2000 |

OTHER PUBLICATIONS

"Digital Wideband Unit (DWU)"—DigiTest Architecture–The Goods—www.tollgrade.com.
"Telecommunications Engineering and Operations: Network Challenges, Business Issues, and Current Developments", Comprehensive Report, presented by the International Engineering Consortium, Next Generation Copper Testing, S. Grady and R. DeMeyer; Implementation of Network Testing, J. Newbrough; pp. 125–131 and 133–139 and Table of Contents.
"Mechanized Loop Testing Strategies and Techniques", F. J. Uhrane, The Bell System Technical Journal. vol. 61, No. 6, Jul.–Aug. 1982, pp. 1209–1234.
"Mechanized Loop Testing Design", O. B. Dale, T. W. Robinson, E. J. Theriot, The Bell System Technical Journal, vol. 61, No. 6, Jul.–Aug. 1982, pp. 1235–1256.

(List continued on next page.)

Primary Examiner—Forester W. Isen
Assistant Examiner—Donald L. Storm
(74) Attorney, Agent, or Firm—Joseph Giordano

(57) ABSTRACT

A method for determining the make up of a subscriber loop via improved time-domain reflectometry techniques by analyzing the echo responses generated by transmittal of pulses onto the subscriber loop. In the method discontinuities along a loop are identified sequentially and in a step-by-step fashion by comparing the measured waveform to suitable waveforms generated on the basis of a hypothesized topology. Once the generated waveform that best matches the measured data has been found and a discontinuity identified, the waveform generated in correspondence of the loop topology identified so far is subtracted from the measured data to produce a compensated waveform, which, is more suitable for detection and location of the next echo.

16 Claims, 28 Drawing Sheets

OTHER PUBLICATIONS

"Second–Generation Mechanized Loop Testing System—A Distributed Microprocessor Application", H. Rubin, The Bell System Technical Journal, vol. 61, No. 6, Jul.–Aug. 1982, pp. 1257–1274.

"Time Domain Reflectometry Applications for Telephony", Tektronix, Inc., Communications Network Analyzers, Tektronix A Test and Measurement, pp. 1–9.

"America's Network—Line Dancing with DSL", Shira Levine, Provisioning, Jan. 1, 2000.

"Telephone Access Network Measurements", Todd Baker, Rick Puckett, Tektronix, pp. 1–74.

"1503C Metallic Time–Domain Reflectomer, 070–7323–04", Tektronix User Manual, firmware version 5.02 and above, 1997 revised Nov. 1998.

* cited by examiner

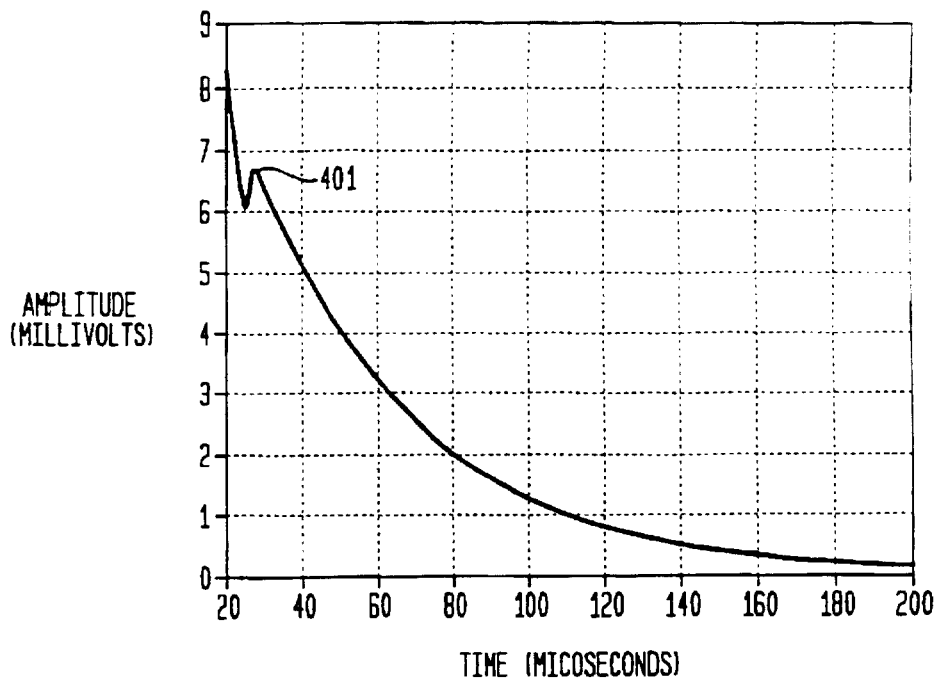
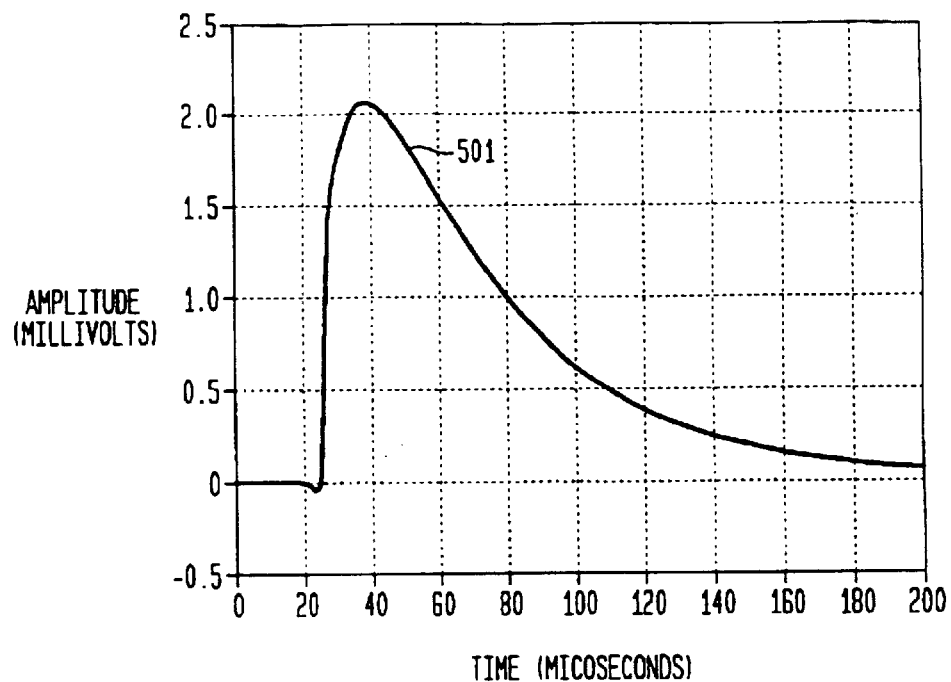

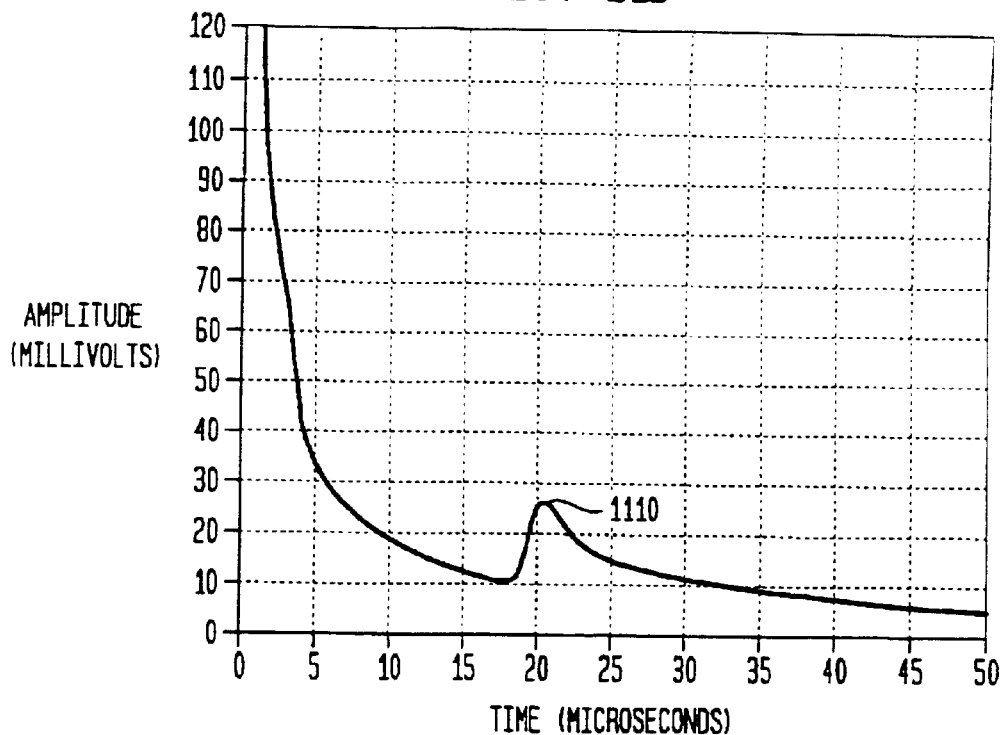
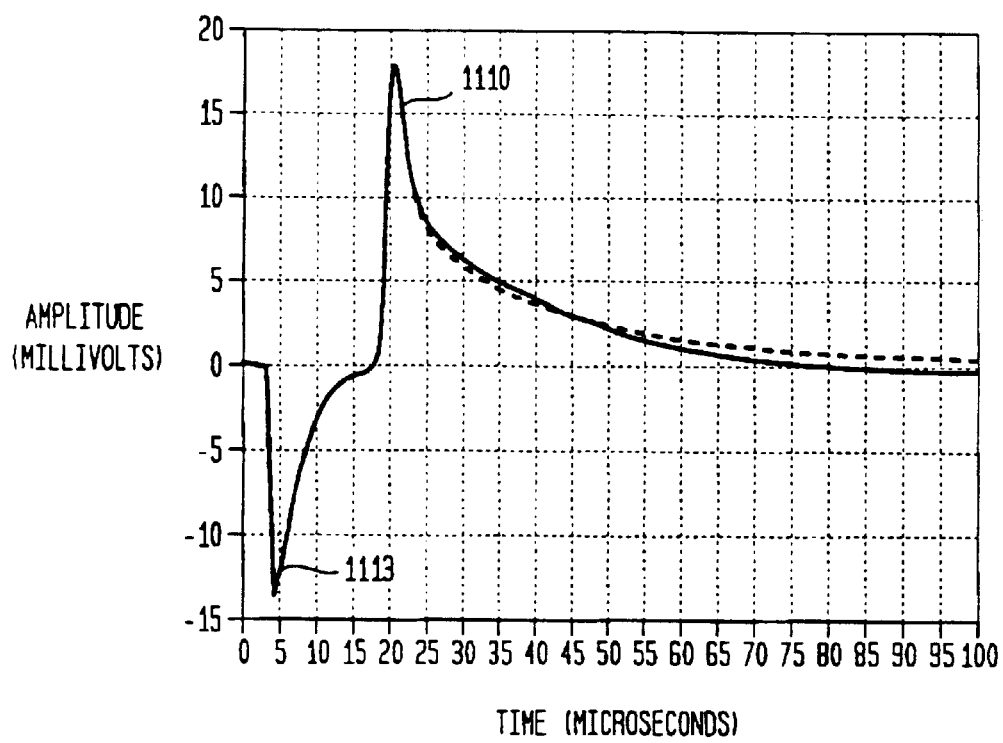

METHOD FOR DETERMINING SUBSCRIBER LOOP MAKE-UP BY SUBTRACTING CALCULATED SIGNALS

RELATED APPLICATIONS

The present application claims the benefit of U.S. Provisional Application No. 60/157,094 filed on Sep. 30, 1999, entitled "Method and Circuitry for Measuring Weak Echoes on Subscriber Loops". The present application is related to U.S. application Ser. No. 09/587,459 filed on Jun. 5, 2000 and entitled "Single Ended Method and System for Determining Subscriber Loop Make-Up" and which is assigned to the assignee of the present invention.

FIELD OF THE INVENTION

This invention is related to determining the make-up of copper loops in the public switched telephone network and specifically to determining the make-up of these loops by processing echo signals generated at discontinuities on the loop.

BACKGROUND

The mainstay of the telephone company local network is the local subscriber loop. The great majority of residential customers, and many business customers, are served by metallic twisted pair cables connected from a local switch in the central office to the subscriber's telephones. When customers request service, request a change in service, or drop service, these facilities must be appropriately connected or arranged in the field, referred to as the "outside plant," and telephone companies have specially trained craft dedicated full time to this task. Obviously a company needs to have an understanding of its subscriber loops including where they are connected and the location of the flexibility points such as junction boxes, etc. These records historically were kept on paper, called "plats," and more recently are manually entered into a computer database. However, even when entered into a database there are still problems associated with keeping the records accurate and up-to-date.

Having accurate records of the loop plant is critically important to many aspects of a telephone company's business. In addition to the need for accurate records to provide traditional voice services, there will be a need for even more accurate and detailed records in order to deploy a whole new class of "xDSL" based services, including those based on integrated services digital network (ISDN), high-rate digital subscriber line (HDSL), asymmetrical digital subscriber lines (ADSL) and very high rate digital subscriber lines (VDSL) technology. These technologies are engineered to operate over a class of subscriber loops, such as nonloaded loops (18 kft) or Carrier Serving Area (CSA) loops (9 to 12 kft). In fact, the need to be able to "qualify" a loop for provision of one of these technologies is becoming critical, as these technologies emerge and deployment begins. The ability to easily and accurately qualify loops will allow telephone companies to offer a whole range of new services; problems and high expenses associated with qualifying loops can potentially inhibit deployment and/or lower or forego associated new revenues. Unscreened multipair cables in the existing subscriber loop network constitute the main access connection of telephone users to the telephone network. Recently, the demand for new services such as data, image and video has increased tremendously, and telephone companies plan to deliver broadband ISDN services via fiber optic local loops. However, the deployment of fiber optic cables in the access plant will require at least twenty years, so that, in the meantime, it is extremely important to fully exploit the existing copper cable plant.

Although there are many different digital subscriber line services, for example, ISDN basic access, HDSL, ADSL, VDSL, and Synchronous DSL (SDSL), these services are not always available to every customer since copper lines present more problems than expected. In fact, the cable length and the presence of load coils and bridged taps may affect the performance of DSL services. Unfortunately, loop records are unreliable and often don't match the actual loop configuration, so existing databases cannot be fully exploited.

Loop prequalification is an important issue not only because it can help an economic deployment of DSL services, but also because it can help telephone companies in updating and correcting their loop-plant records. From this point of view, the feasibility of accurate loop make-up identification has much higher economic value than simple DSL qualification.

One way to obtain accurate loop records is to manually examine the existing records and update them if they are missing or inaccurate. This technique is expensive and time consuming. Furthermore, new technologies such as xDSL require additional information that was previously not kept for voice services, so there is the potential that new information needs to be added to existing loop records. Test set manufacturers offer measurement devices that can greatly facilitate this process, but typically they require a remote craft dispatch.

Another way to obtain accurate loop records is by performing a loop prequalification test. There are essentially two ways of carrying out a loop prequalification test: double ended or single-ended measurements. Double-ended measurements allow us to easily estimate the impulse response of a loop by using properly designed probing sequences. Double-ended testing, however, requires equipment at both ends of the loop. Specifically, in addition to equipment at the Central Office (CO) or near end of the loop, double ended testing involves either the presence of a test device at the far end of the loop (Smart Jack or MTU), or dispatching a technician to the subscriber's location (SL) to install a modem that communicates with the reference modem in the CO. An exemplary double ended system and method that extrapolates voice band information to determine DSL service capability for a subscriber loop is described in Lechleider, et. al., U.S. Pat. No. 6,091,713, entitled "Method and System for Estimating the Ability of a Subscriber Loop to Support Broadband Services" (which is assigned to the assignee of the present invention). In addition, craft persons may activate software located at remote sites.

In contrast, single ended tests are less expensive and less time consuming than double-ended tests. Single-ended testing requires test-equipment only at one location, e.g., the CO. In fact, there is no need to dispatch a technician and the CO can perform all the tests in a batch mode, exploiting the metallic access with full-splitting capability on the customer's line. An example of such a single ended test system is the "MLT" (Mechanized Loop Testing) product that is included as part of the widely deployed automated loop testing system originally developed by the Bell System. The MLT system utilizes a metallic test bus and full-splitting metallic access relays on line card electronics. By this means, a given subscriber loop can be taken out of service and routed, metallically, to a centralized test head, where single-ended measurements can be made on the customer's loop. The test head runs through a battery of tests aimed at maintaining and diagnosing the customer's narrowband (4 kHz) voice service, e.g., looking for valid termination signatures via application of DC and AC voltages. This system is highly mechanized, highly efficient, and almost universally deployed. In addition, the MLT system is linked to a Line Monitoring Operating System (LMOS) thereby providing a means to access and update loop records which are useful in responding to customer service requests or complaints. However, because this system exclusively focuses on narrowband voice services, the system misses important loop make-up features that will be deleterious to supporting broadband services via DSL technologies.

Another well known singlended measurement technique relies on the observation of echoes that are produced by medium discontinuities to fully characterize the link. Specifically, these single ended measurements typically rely on time domain reflectometry (TDR). TDR measurements are analogous to radar measurements in terms of the physical principles at work. TDR test systems transmit pulses of energy down the metallic cable being investigated and once these pulses encounter a discontinuity on the cable a portion of the transmitted energy is reflected or echoed back to a receiver on the test system. The elapsed time of arrival of the echo pulse determines its location, while the shape and polarity of the echo pulse(s) provides a signature identifying the type of discontinuity that caused the reflection or echo. Basically, if the reflecting discontinuity causes an increase in impedance, the echo pulse's polarity is positive; if the reflecting discontinuity causes a decrease in impedance, the echo pulse's polarity is negative. A bridged tap, for example, produces a negative echo at the location of the tap and a positive echo at the end of the bridged tap. Accordingly, a trained craftsperson is able to determine the type of fault based on the shape, polarity, sequence of pulses.

Nevertheless, TDR methods (or, in general, single ended measurements that rely on echo pulse signatures) are inaccurate and provide ambiguous results that even the most skilled craftsperson cannot interpret. Because the arrival of the echoes is dependent on the location of the discontinuities (or faults) one echo can be masked by another echo if the echoes overlap. In addition, prior art TDR methods do not take into account, more specifically, are unable to separate, the effects of spurious echoes, i.e., echoes generated by a portion of the probing pulse that is reflected from a discontinuity, from real echoes, i.e., echoes generated from the probing pulse being reflected by a discontinuity. Although spurious echoes will be more attenuated than real echoes, they are added to the real echoes causing the real echo signals between to be distorted. Accordingly, spurious echoes enhance the ambiguity inherent in TDR measurements because the shape of the echo is used to interpret the type of fault that caused the echo. In other words, a craft person interpreting a TDR measurement analyzes a distorted trace that does not distinguish spurious echo distortion. More importantly, the effects of spurious echoes on the pulse shape cannot be interpreted via human visual inspection. Further, the effective range of today's commercial TDRs is quite limited since it is impossible to see echoes from discontinuities located more than a few kilofeet away from the detection point. Finally, we are unaware of any commercial TDR having the capability to detect gauge changes.

In Galli, et. al. U.S. application Ser. No. 09/587,459 (hereinafter Galli) a method and system for determining loop makeup based on the echo signatures caused by discontinuities as a pulse traverses a loop is disclosed; note that Galli is also a co-inventor on the present invention. Although the Galli method is able to determine loop makeup more accurately and overcomes the prior art problems highlighted above, the method does have some shortcomings. First, the method works well only where the loop is less than approximately 8,000 feet (8 kft). Once the length of the loop increased significantly beyond 9 kft the method is not able to identify loop discontinuities with the same success because of noise enhancement due to the use of the reciprocal of the insertion loss. Second, Galli's method may not achieve unambiguous loop make-up identification if the topology of the loop under test does not belong to the set of "well-behaved" loops, i.e., loops that follow the recommended design rules.

Of utility then would be a method and system that overcomes the shortcomings of the prior art, generally, and more specifically the shortcomings of commercial TDRs and Galli.

SUMMARY

In accordance with the present invention the limitations and shortcomings of the prior art are overcome by enhancing the range and resolution of commercial TDRs and by allowing accurate unambiguous determination of a subscriber loop make-up.

In particular, an aspect of the present invention is a method and circuitry for enhancing the performance of commercial TDRs. In more detail, the inductive effect of a subscriber loop is taken into account when processing echo signals that are the result of probing the loop with pulses. In accordance with this aspect of our invention we remove a slowly decaying signal caused by the inductive effect of the loop from the echo signals. Accordingly, the echo signals are no longer masked by the slowly decaying signal thereby increasing the accuracy and range of a measurement system built in accordance with the present invention. This particular aspect of the present invention will be useful in TDR measurements by increasing their range and by allowing gauge change detection. The effective range of a TDR designed in accordance with this aspect of the present invention is dependent only on the energy of the probing pulse, i.e., in principle the range is unbounded. In accordance with this aspect of our invention, differential probing circuitry that improves the performance of TDRs is disclosed. The probing circuitry improves the accuracy of a TDR by rejecting the deleterious effects of common mode propagation.

In another aspect of the present invention, we provide a method for unambiguous and precise loop make-up identification. In accordance with this aspect of the present invention the input impedance of the loop as a function of frequency is used in the process of identifying discontinuities and other features represented by the echo signals. This is accomplished by first calculating the input impedance of the loop as a function of frequency. The input impedance of the loop is then convolved, in the frequency domain, with the Fourier transform of the probing signal. Finally, a simulated waveform of the discontinuity in the time domain is obtained by inverse Fourier transforming the result of the convolution. This simulated waveform is then compared to the actual echo signal caused by the discontinuity. If the comparison yields an acceptable match, e.g., within a predetermined error margin, then the discontinuity is identified and the signal corresponding to that discontinuity is removed by subtracting the simulated waveform from the acquired data. This is done for each discontinuity encountered until the last discontinuity is identified. In accordance with this aspect of the invention all the shortcomings of Galli are overcome.

By employing all the foregoing aspects of the present invention, it is possible to completely determine the make-up of a loop of any length and any topology.

BRIEF DESCRIPTION OF THE DRAWINGS

FIG. 4 depicts the signal of FIG. 3 with particular emphasis on the slowly decaying portion of the signal;

FIG. 5 depicts the echo generated by an unterminated, 8 kft long, 26 AWG loop without taken into account a loop's inductive behavior;

FIG. 11B depicts the echo response of the loop of FIG. 11A without compensating for the inductive behavior of the loop;

FIG. 11C depicts the echo response of the loop of FIG. 11A after compensating for the inductive behavior of the loop;

DETAILED DESCRIPTION

The detailed description given below is divided into three sections. In particular, section 1 discusses a model for weak echoes, the importance of the information contained in the input impedance of a loop, and the method for unambiguous loop make-up identification. Section 2 describes a novel differential probing apparatus or circuitry that effectively rejects the deleterious effects of common mode propagation thereby enabling cleaner measurements of echoes. Section 3 goes through the process, step-by-step, of loop identification in accordance with the present invention using the method steps of FIG. 17 and the measurement setup of FIG. 22.

1. Method for Unambiguous Loop Make-UP a. Weak Echoes: The Underlying Model

In arriving at a method for determining a subscriber loop makeup it is necessary to start with a model. The model ultimately determines the success or reliability of the method in that the model is an integral part of the method. In the present invention (as in the invention of Galli, et. al., U.S. patent application Ser. No. 09/587,459 (hereinafter Galli)) the underlying model is critical to the detection of discontinuities/faults because the model is used in simulating expected responses that are compared to actual responses to identify the fault and ultimately determine loop makeup. As such, inaccuracies in the underlying model may be amplified as the process or method progresses.

Accordingly, when measuring weak echoes such as those generated by long loops, the model given in Galli (who is a co-inventor in the present invention) falls short. In fact, the previously developed Galli model does not take into account the inductive behavior of the loop nor its behavior as a distributed circuit. If an echo is very strong, i.e., high amplitude, this behavior may be neglected whereas, in the case of weak echoes, neglecting the loops inductive behavior turns out to be too harsh an approximation leading to incorrect fault detection and limiting the reach of the detection system.

Figure 1:
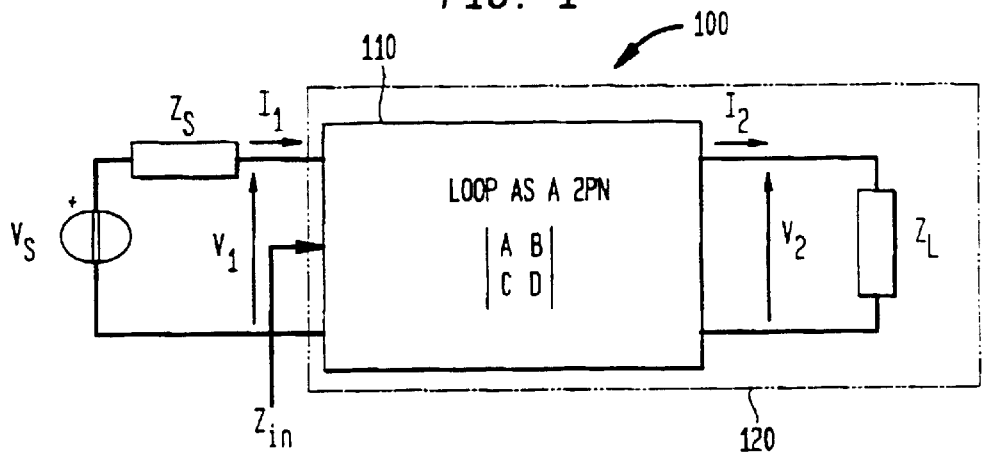
FIG. 1 depicts a subscriber loop as a two port network.

Specifically, lets consider a circuit 100 as shown in, FIG. 1, where the loop is represented by a two-port network (2PN) 110. If we apply the Thevenin theorem to the circuit 100 in FIG. 1, block 120 may be represented by a single impedance equal to the input impedance of the 2PN (i.e., the input impedance of the loop):

$$Z_{in}(f) = \frac{AZ_L + B}{CZ_L + D} \quad (1)$$

The input impedance of the loop is a complex function of frequency and obviously depends on the termination of the loop, the load impedance $Z_L$. In the case of an unterminated loop (i.e., infinite load impedance), the relationship in eqn. (1) reduces to the following expression:

$$Z_{in}^{(unterm)}(f) = \lim_{Z_L \to \infty} \frac{AZ_L + B}{CZ_L + D} = \frac{A}{C} \quad (2)$$

Figure 2:
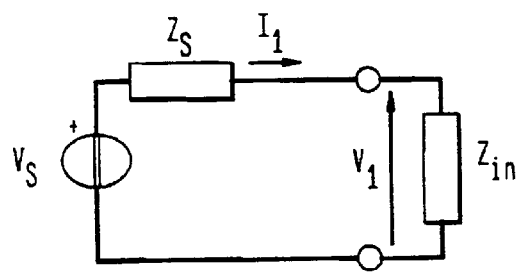
FIG. 2 is the equivalent circuit of FIG. 1 with the loop portion replaced by its Thevenin equivalent circuit.

The signal actually entering the loop is $V_1(f)$, as shown in FIG. 2, and $V^1(f)$ is tied to the source waveform $V_s$ in the frequency domain as follows:

$$V_1(f) = \frac{Z_{in}}{Z_{in} + Z_S} V_S(f) \quad (3)$$

where $Z_{in}$ is as defined by Equation (1) and $Z_s$ is the impedance of the source, as shown in FIG. 2.

Figure 3:
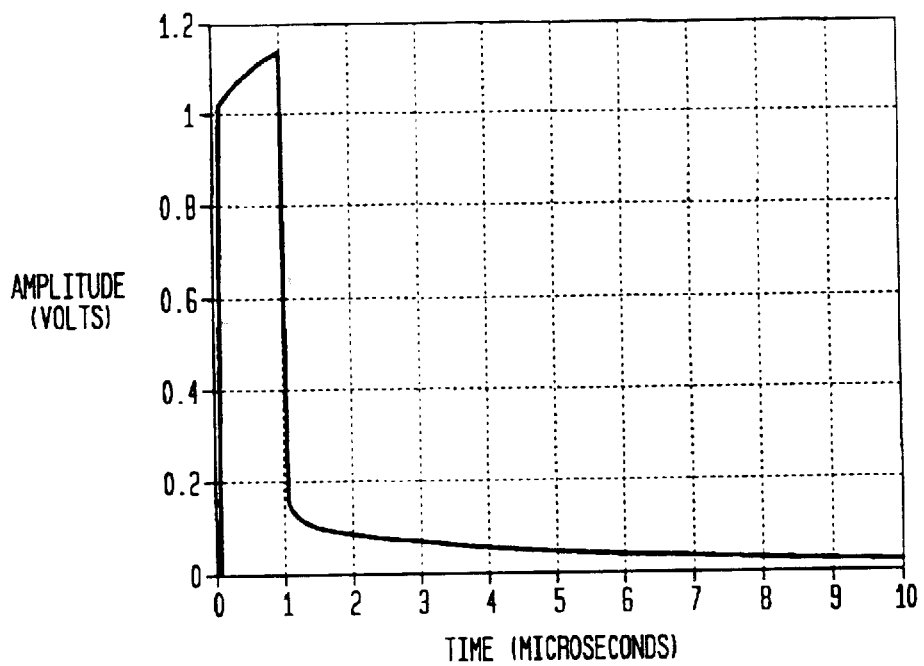
FIG. 3 depicts the actual voltage appearing across an unterminated, 8 kft long, 26 AWG loop when a square wave is applied to the loop.

As an example let us consider the case where $V_s$ is an ideal square pulse of 1 $\mu$s width and 1 Volt (over 100 ohms) amplitude injected into an unterminated 8 Kft long 26 American Wire Gauge (AWG) cable. The behavior of $V_1$ versus time is plotted in FIG. 3. From FIG. 3 it can be seen that the actual waveform entering the loop is not a square waveform anymore. In particular, the signal does not go to zero at t=1 $\mu$s but drops down to approximately 100 mV and then decays very slowly towards zero. This phenomenon, due to the inductive behavior of a loop, is negligible if the amplitude of the echoes is large/strong enough, but has to be taken into account when dealing with very weak echoes (low amplitude echoes). In particular, the slowly decaying signal and arriving echo signals caused by loop discontinuities overlap masking the arriving echo signals. This can be seen in FIG. 4 where an exploded view of the waveform of FIG. 3 has been plotted from t=20 $\mu$s to t=200 $\mu$s. The spike, 401, present at approximately 25 $\mu$s represents the echo coming back from the unterminated end of the loop and is superimposed on the slowly decaying signal. The importance of not accounting for the inductive behavior of the loop may be better appreciated by reference to FIG. 5, where the echo 501 received from the end of the same loop used in FIG. 4 is shown without being superimposed on the slowly decaying signal. As FIG. 5 shows the echo 501 received from the unterminated end of the 8 Kft long, 26 AWG loop is prominent and of a much higher amplitude than in FIG. 4. Accordingly, where the echo response is weak the inductive behavior of the loop will mask real echo responses leading to inaccuracies in loop makeup identification.

Figure 6:
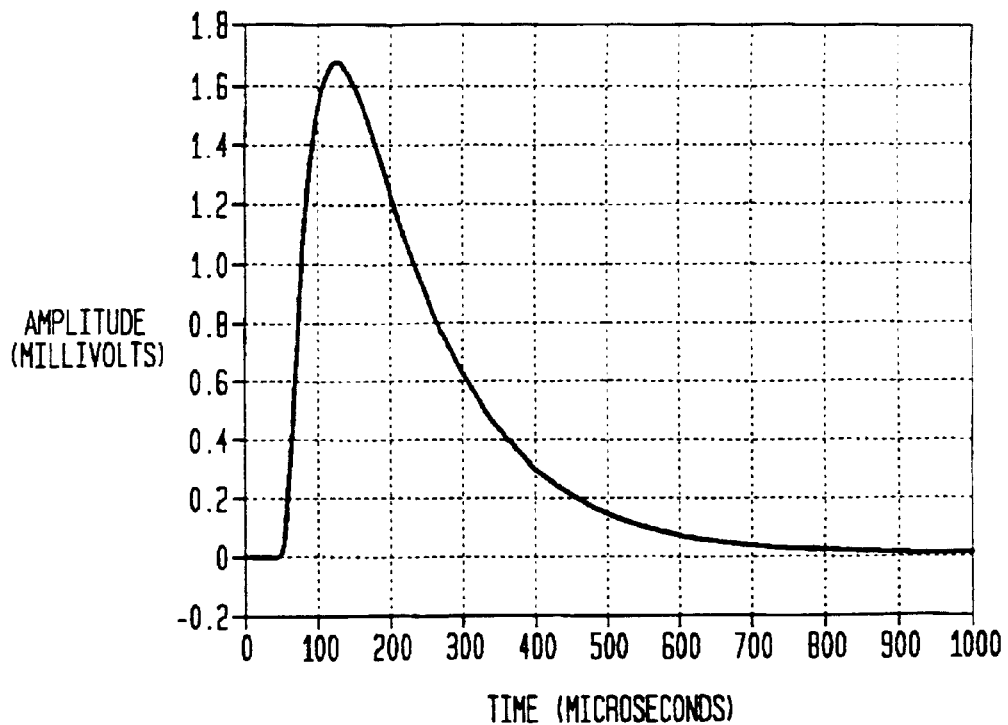
FIG. 6 depicts the voltage across an unterminated, 15 Kft long, 26 AWG cable when the injected signal is a square wave of 5 microseconds of width and of 1 Volt (over 100 ohms) of amplitude.
Figure 7:
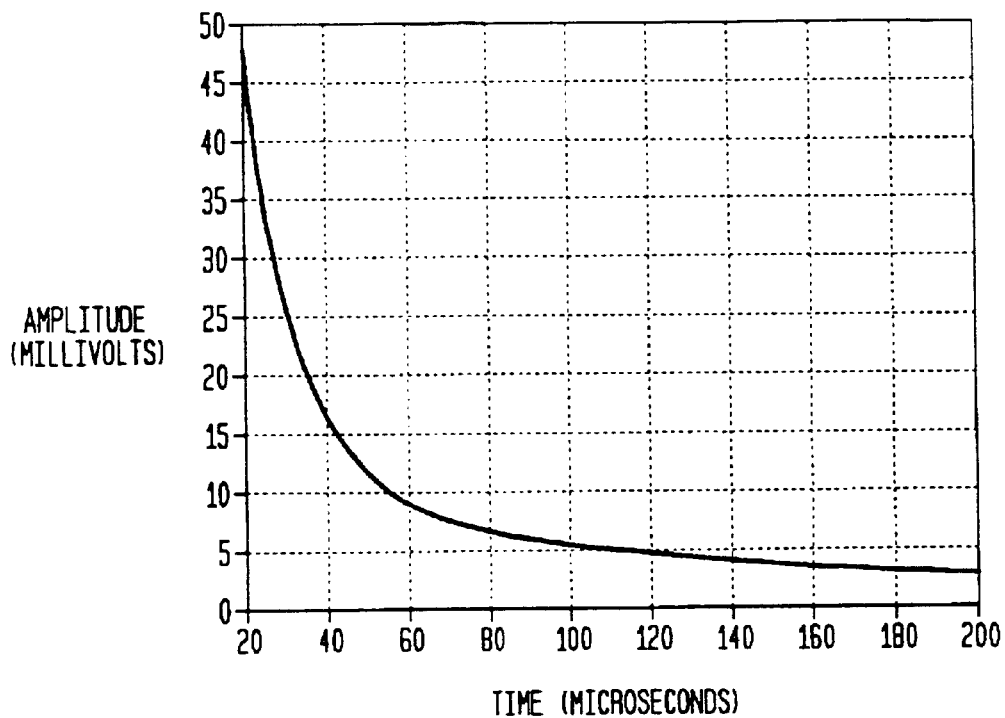
FIG. 7 depicts echo generated by an unterminated, 15 Kft long, 26 AWG cable without taking into account the inductive behavior of the loop.

In principle, the echo overlapping the decaying signal will be visible if the echo signal is "sufficiently" strong, has a sharp rise and if it is not too broad. For this reason it may be very difficult to detect echoes coming back from very long loops since those echoes are very weak and broad. As an example, let us consider the response of a 15 Kft long, 26 AWG loop to a square pulse of 5 $\mu$s of width and 1 Volt (over 100 ohms) of amplitude. The echo coming back from the end of the loop on the basis of the model in Galli is shown in FIG. 6 whereas the response on the basis of eqn. (3) is plotted in FIG. 7. As can be seen from FIG. 7, the echo generated at the unterminated end is not visible.

Figure 8:
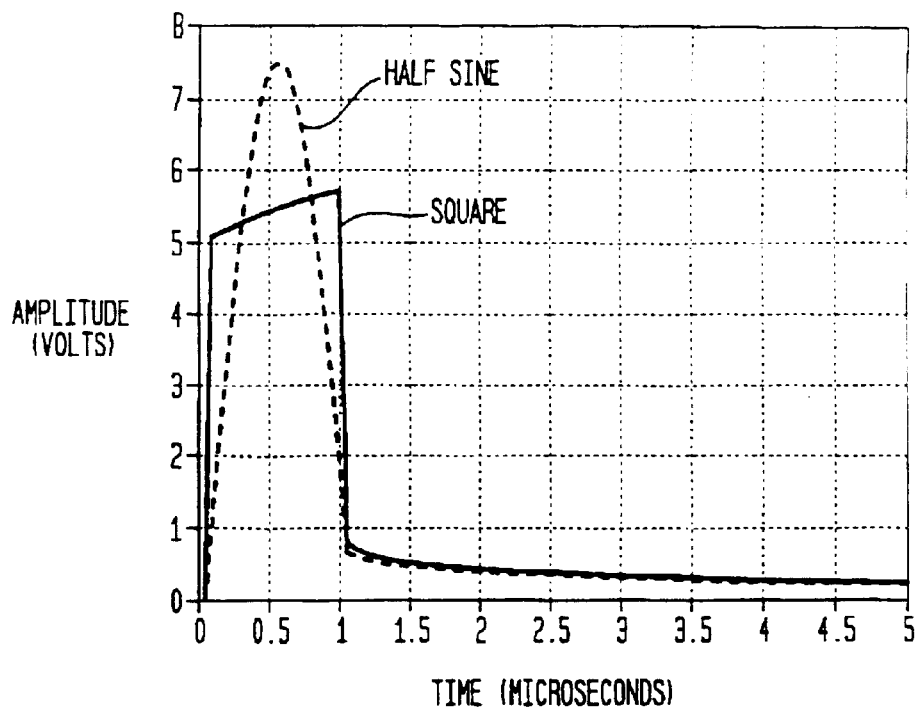
FIG. 8 depicts the responses of a 8 Kft, 26 AWG unterminated loop for different probing signals: square pulse (solid) and half-sine (dashed)

It is worth pointing out that the presence of the decaying waveform is not due to the particular choice of the probing signal. In fact, even if a probing signal different from a square pulse is used, the received echoes would still be superimposed on a slowly decaying waveform since this is due to the intrinsic inductive behavior of the loop. As an example, let us compare the square pulse with a half-sine pulse (see FIG. 8). The half-sine pulse is typically used in high resolution TDRs and it is commonly claimed that it yields to higher echo resolution than the square pulse. The mathematical expressions of these two probing signals are:

$$\begin{cases} \text{Square pulse} \Rightarrow s_{sp}(t) = A, & \text{for } 0 \leq t \leq \tau \\ \text{Half-sine pulse} \Rightarrow s_{hs}(t) = \\ \sqrt{2} A \sin(2\pi f_o t), & \text{for } 0 \leq t \leq \tau \ (f_o = 1/2\tau) \end{cases} \quad (3a)$$

Figure 9:
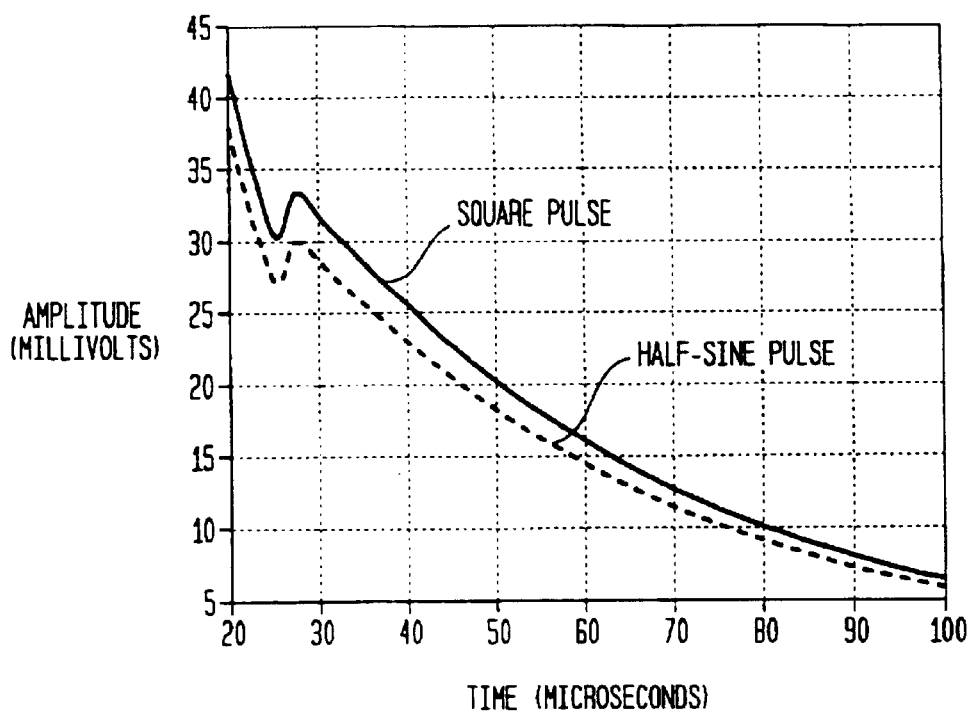
FIG. 9 depicts the signals of FIG. 8 with particular emphasis on the slowly decaying portion of the signals.

We simulated the responses of a 8 Kft long, 26 AWG unterminated loop to the two pulses in Eqn. (3a) and as FIG. 9 shows there is no substantial difference for either type of pulse of FIG. 8. The half-sine pulse is widely used in today's high resolution TDRs but it does not produce better results than a normal square pulse. However, there are practical advantages to using a half-sine pulse instead of a square pulse. In fact, a half-sine pulse has more energy at low frequencies than a square pulse and this property has a twofold advantage. First, it may be more useful to detect gauge changes since the reflection coefficient of a gauge change is characterized by a low-pass behavior. Second, injecting low frequency pulses in a pair that's being probed would cause less crosstalk in adjacent pairs that, at the time of probing, may be supporting DSL services. Another advantage of using a half-sine pulse is that it is easier, from an implementation point of view, to generate "cleaner" high-amplitude half-sine pulses instead of high-amplitude square pulses. However, other than the above mentioned practical advantages there is no conceptual difference between the echo response to a square pulse or to a half-sine pulse.

Figure 10:
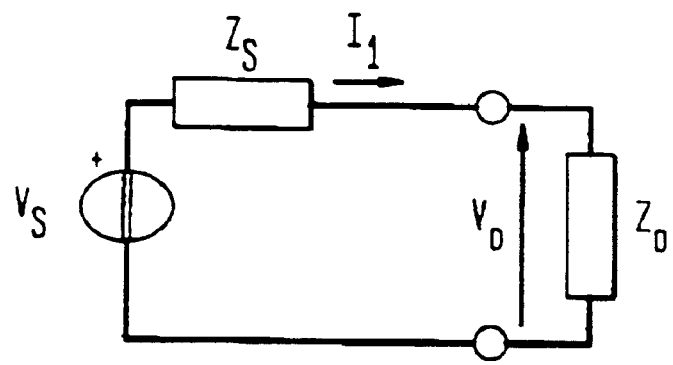
FIG. 10 depicts the equivalent circuit of FIG. 1 used for the computation of the slowly decaying waveform superimposed to the echoes.

Since the presence of the decaying signal is unavoidable, the only way to reduce or compensate for its effects is to include its effect when processing the echoes that result from reflection at discontinuities. Fortunately, it is possible to analytically compute the expression of the slowly decaying waveform. In order to compute this expression, we need to consider that the signal injected into the loop "sees" a load equal to the characteristic impedance of the first section of the loop. This may not be evident from the model shown in FIGS. 1 and 2 because that model describes the loop as a 2PN and neglects the fact that the loop is actually a transmission line and not a simple circuit with discrete lumped components. The input impedance of the loop gives a global description of the resources of the whole loop to a probing signal. But, if we want to take into account that the loop is actually a transmission line, we have to take into consideration that it is the first section of the loop that influences the characteristics of the probing signal entering the loop. In fact, the probing signal injected into the line propagates along the loop as if it were traveling along an infinitely long loop. Since the input impedance of an infinitely long loop is equal to the characteristic impedance of the loop, the correct model describing the voltage across the pairs is the one in FIG. 10. This model remains valid until the traveling wave encounters a discontinuity along the line, e.g., a gauge change, a bridged tap, or an unterminated end. In fact, the presence of a discontinuity along the line causes an abrupt change in the boundaries conditions of the equations describing the traveling wave and, therefore, a change of its shape. Moreover, the changes caused by discontinuities on the probing signal traveling along the loop will always take place later in time and should not influence at all the shape of the probing signal before it encounters these discontinuities. On the basis of the previous considerations, we can express the slowly decaying wave form $V_o(f)$ in the following form (see FIG. 10):

$$V_o(f) = \frac{Z_o}{Z_o + Z_S} V_S(f) \quad (4)$$

where $Z_o$ is the characteristic impedance of the loop, as shown in FIG. 10.

Eqn. (4) is the exact expression of the slowly decaying waveform until the first discontinuity has been encountered and its effect (the echo) has arrived back at the beginning of the loop.

As previously mentioned, the voltage $V_1(f)$ given in eqn. (3) is the waveform obtained when we consider the loop as a discrete lumped circuit (and, therefore, all the discontinuities along the loop are included) whereas the voltage $V_o(f)$ in eqn. (4) is the waveform obtained when we take into account the actual nature of the loop as a transmission line (and, therefore, only the presence of the first loop section). On the basis of the previous considerations, subtracting $V_o(f)$ from $V_1(f)$ should remove the slowing decaying waveform due to the inductive behavior of the loop and allow for easier detection of weak and broad echoes. So, the expression, V(f), for an echo signal, taking into account the effects of the slowly decaying signal (i.e., the inductive behavior of the loop) should be approximately given by the following expression:

$$V(f) = V_1(f) - \quad (5)$$

$$V_0(f) = \left[\frac{Z_{in}}{Z_{in} + Z_S} - \frac{Z_o}{Z_o + Z_S}\right] V_S(f) = \frac{(Z_{in} - Z_o)Z_S}{(Z_{in} + Z_S)(Z_o + Z_S)} V_S(f)$$

Figure 11A:
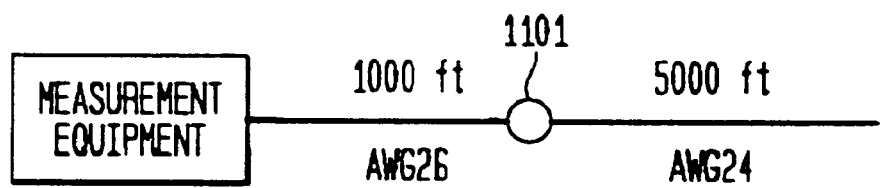
FIG. 11A illustrates an exemplary loop having a gauge change.

The subtraction of waveform eqn. (4) from waveform eqn. (3), resulting in eqn. (5), is a very useful technique in that it allows us to detect discontinuities located far away from the measurement location. Moreover, this technique is also very useful for the detection of gauge changes which are not detectable unless the slowly decaying waveform is removed as by eqn. (5). As an example, let us consider the echo response of the loop in FIG. 11A that contains a gauge change 1101. The echo response without accounting for the decaying signal (using eqn. (3)) is shown in FIG. 11B. Even though the discontinuity is very near (just 1000 feet away from the measurement equipment), only the echo 1110 given by the unterminated end of the loop is clearly visible. However, using eqn. (5) we obtain the plot in FIG. 11C which clearly shows the presence of another echo 1113 that is due to the gauge change.

Figure 12A:
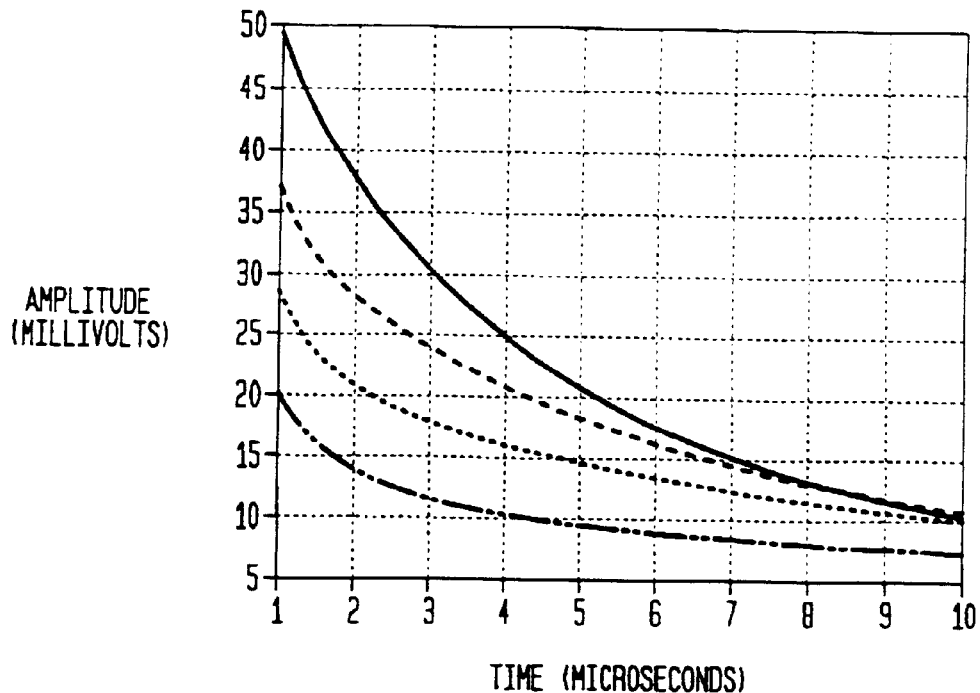
FIG. 12A depicts the slowly decaying waveform caused by different cable gauges over a 50 microsecond time scale.
Figure 12B:
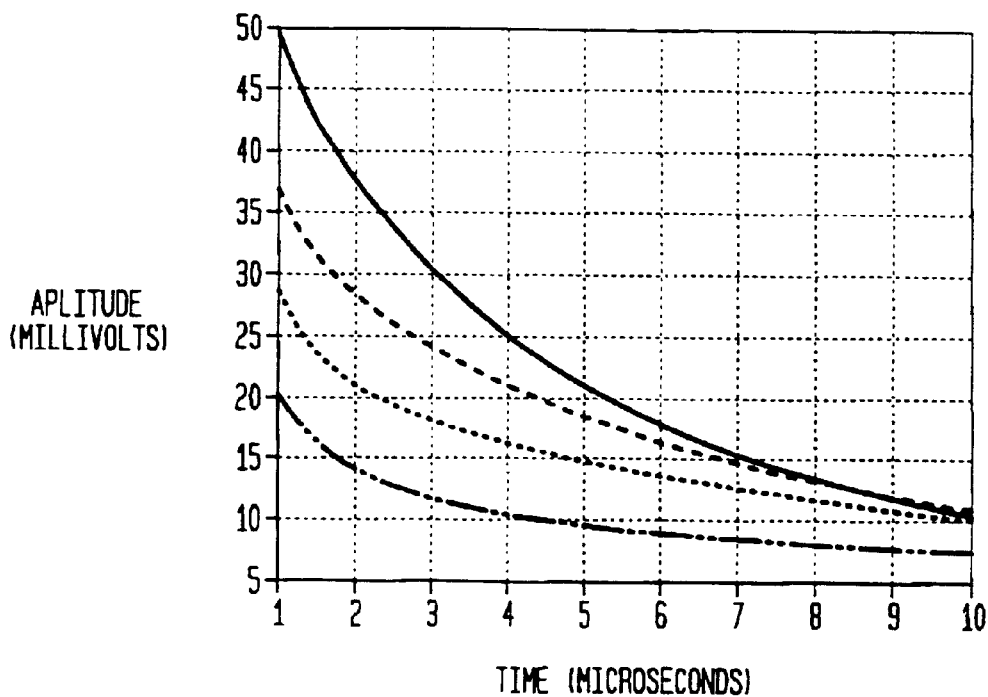
FIG. 12B depicts the waveform of FIG. 12A over a 10 microsecond time scale.

In principle, the computation of the slowly decaying waveform in eqn. (4) requires the knowledge of the type of gauge of the first loop section. The gauge of the first loop section is constituted by the cable coming out of a Central Office (CO) and it is reasonable to assume that this information is known. However, if this information were not available a priori it is still possible to identify the kind of gauge of the first loop section by trial and comparison. FIG. 12 shows the behavior of eqn. (4) for different kinds of gauges and for a 1 Volt and 100 ns square pulse probing signal. As it can be seen from FIG. 12, different kinds of gauges produce different slowly decaying waveforms. This suggests that it is convenient to probe the loop with very short pulses and, then, compare the observed signal with the signals given by all the possible gauges. In fact, looking at FIG. 12A we can see that the waveforms tend to be very similar after the first 20 microseconds, whereas they are quite different in the first 15 microseconds (see FIG. 12B). This property can be exploited by computing the difference between the observed slowly decaying waveform and the simulated ones and, then, determining the kind of gauge that yields to the smallest difference signal.

Those or ordinary skill in the art will note that the waveform or signal corresponding to $V_o(f)$ in eqn. (4) can be obtained by probing a long loop, e.g., 20 kft–30 kft, of characteristic $Z_o$. As a practical matter, the long loop can be probed using a conventional or prior art TDR; that is, $V_o(f)$ in eqn. (4) can be obtained empirically. The result of the probing can be stored in memory and subtracted from the waveform corresponding to the loop under the test, i.e., the acquired data, which would be obtained by probing the loop under test. Subtracting this empirically waveform from acquired data would be equivalent to subtracting a simulated waveform from the acquired data as indicated in eqn. 5.

It is worth pointing out that this technique has never been used in commercial TDRs. Vendors claim that today's TDRs have ranges up to 50,000 feet and a resolution under one foot. However, the reality is that neither of these claims are achievable without first removing the effect of the slowly decaying signal on the measurements. From this point of view, the previously described technique could be extremely useful to improve the performance of a TDR. In particular, removing the effect of the slowly decaying signal and using the circuitry described in section 2 yields superior performance over prior art TDRs.

b. The Information Contained in the Input Impedance of a Loop

Removing the slowly decaying signal, in effect compensating for the inductive behavior of the loop, as described above in section 1a allows us to obtain much cleaner responses than those available using commercial TDRs. In particular, this technique has allowed us to detect gauge changes and discontinuities located far away from the detector. Another important result of section 1a is that the input impedance of a loop can be viewed as the frequency domain description of the echo observation process. In this section we will describe how the model of section 1a, i.e., the frequency domain representation of the loop input impedance that includes the inductive behavior of the loop, can be used to identify the makeup of a loop and detect discontinuities located far away, including gauge changes.

Figure 13:
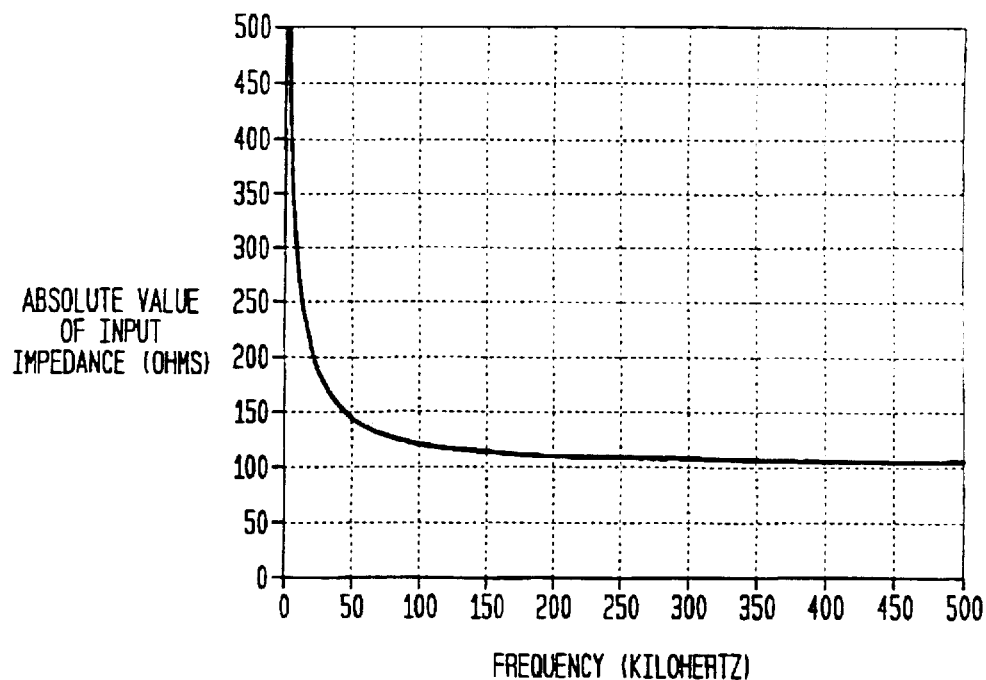
FIG. 13 depicts the absolute value of the input impedance versus frequency for an infinitely long AWG 26 cable.

Since a frequency-domain reflection measurement is the composite of all the signals reflected by the discontinuities over the measured frequency range, the input impedance of a loop contains information on both the real and the spurious echoes that would be generated by probing the medium with a signal. In fact, in our work we have found that different loops or different loop discontinuities provide recognizable signatures in the loop input impedance. The behavior of the absolute value of the input impedance of a few exemplary loops is plotted versus frequency in FIGS. 13–16. In particular, the input impedance of an infinitely long 26 AWG cable is shown in FIG. 13. As FIG. 13 shows, as the frequency increases, $|Z_{in}|$ decreases monotonically to the asymptotical value of 100 ohms.

Figure 14:
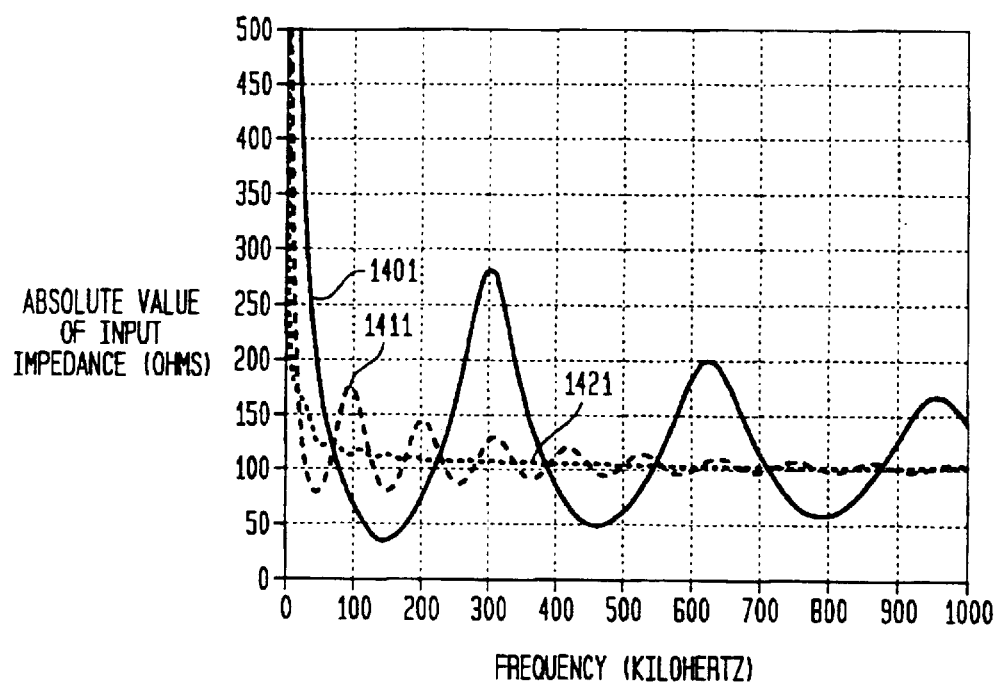
FIG. 14 depicts the absolute value of the input impedance versus frequency for three different unterminated loops.

On the other hand, if a discontinuity is present along the line, the behavior of $|Z_{in}|$ no longer monotonically decreases and, moreover, different discontinuities yield to different behaviors of the input impedance. Specifically, let us consider the case of an unterminated loop as is shown in FIG. 14. In this case, $|Z_{in}|$ initially starts to decrease monotonically and, then, exhibits a damped oscillatory behavior starting at a few tenths of khz. The amplitude and the frequency of these oscillations are tied to the length of the loop: for short loops the amplitude is higher and the frequency is lower and viceversa for longer loops. In FIG. 14 we show the behavior of $|Z_{in}|$ versus frequency for three type of unterminated loops: a 1 kft long AWG 24 unterminated loop 1401, a 10.5 kft long AWG 24 unterminated loop 1411, and a 15 kft long AWG 26 unterminated loop 1421.

Figure 15:
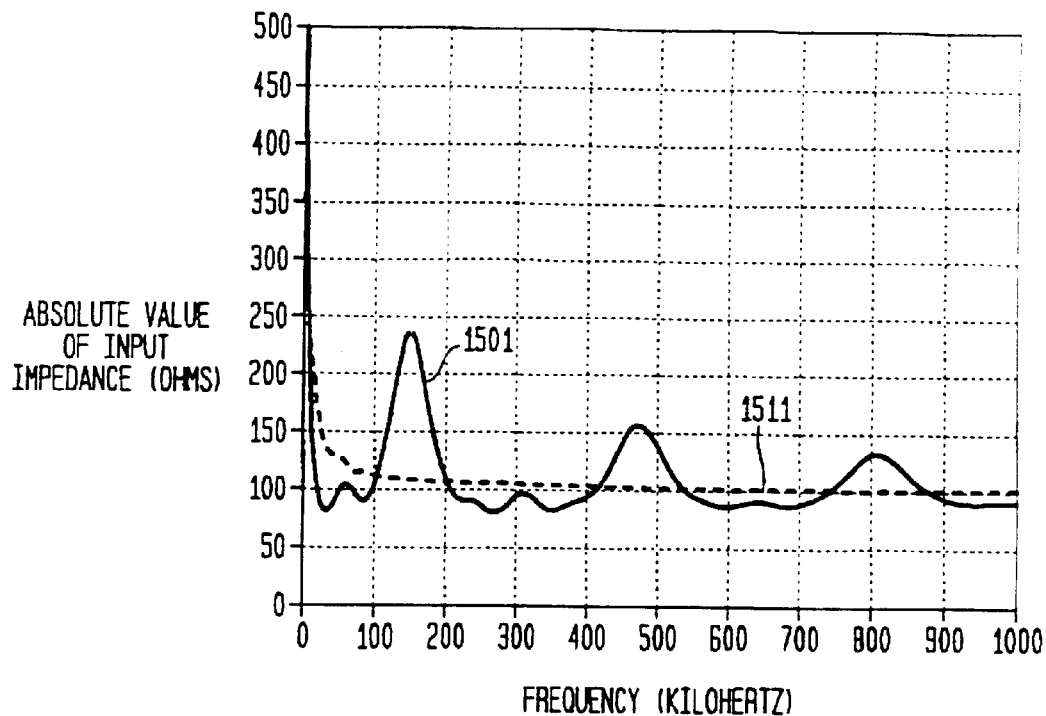
FIG. 15 depicts the absolute value of the input impedance versus frequency for two loops having bridged taps.

Turning now to FIG. 15, there is shown $|Z_{in}|$ for a loop having a bridged tap. As FIG. 15 shows, $|Z_{in}|$ initially starts to decrease monotonically and, after a few tenths of khz, the line exhibits a recurrent pattern: a small peak followed by a bigger peak, both with damping amplitude. However, since the frequency and the amplitude of these peaks depend on the lengths of the loop sections constituting the bridged tap, it is very difficult to establish a general pattern for all the possible configurations of a bridged tap. Specifically, in FIG. 15 we show the behavior of $|Z_{in}|$ versus frequency for two cases: an AWG 24 loop having a 980 ft long bridged tap located 980 ft on the loop 1501 and an AWG 26 loop having a 1500 ft long bridged tap located 6000 ft on the loop 1511.

Figure 16:
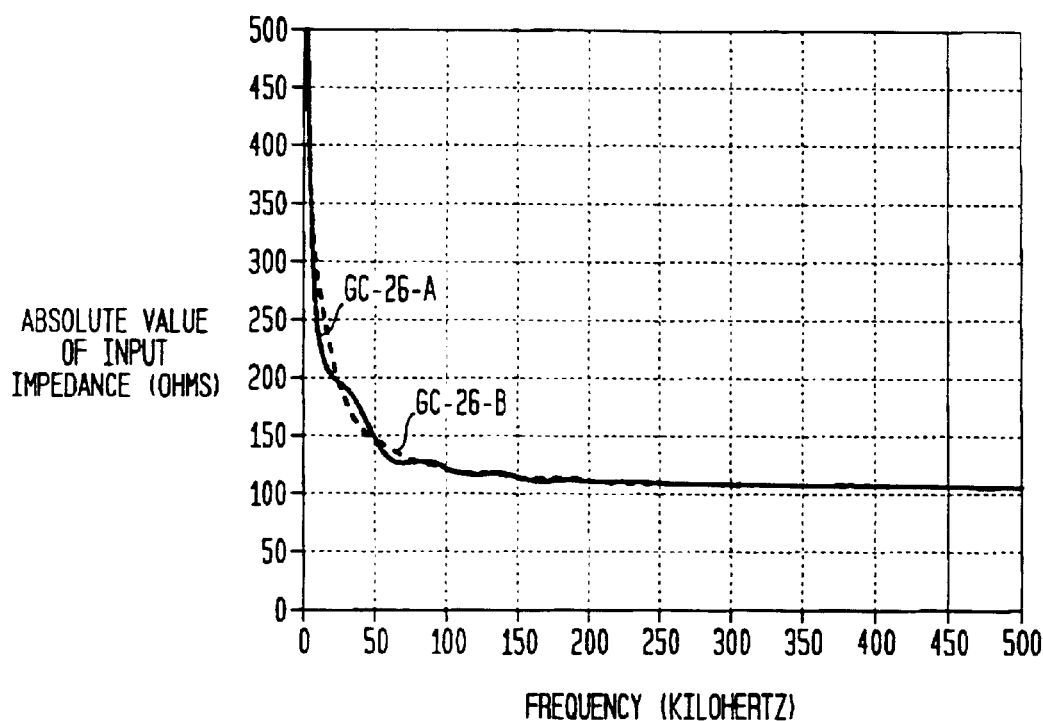
FIG. 16 depicts the absolute value of the input impedance versus frequency for two loops having gauge changes.

Finally, the case of a gauge change is shown in FIG. 16. As shown in FIG. 16, a loop with a gauge change exhibits a ripple but this ripple is very small and difficult to detect. This is not a surprise because, among all the kinds of discontinuities we considered, the gauge change is indeed the hardest discontinuity to detect.

Based on the foregoing, we note the following features of different loops or loop discontinuities. A common property to all the discontinuities is that, when a discontinuity is near, the oscillatory behavior is much more pronounced than for the case of a discontinuity located farther away. This suggests that the "onion peeling" or "de-embedding" method of Galli may also be used to detect/identify discontinuities by sequentially removing the echoes based on their position on the loop, starting with the discontinuity located closest to the measurement equipment and ending with the farthest discontinuity. More importantly, the loop impedance frequency responses of the exemplary loops considered above indicate that the loop can be considered a deterministic or known channel in the frequency domain. On the other hand, the behavior of the input impedance of a loop where discontinuities are located far away resembles the behavior of an infinitely long loop. This property suggests a dual interpretation in the frequency domain of the difficulty of detecting far discontinuities. In fact, note that in the time domain discontinuities located far from the point of detection are very hard to detect because the echoes coming back are very small and very broad, whereas, in the frequency domain, discontinuities located far from the detection point are difficult to detect because they exhibit almost the same behavior of an infinitely long loop, i.e. a loop without discontinuities.

The deterministic nature of the loop had been exploited in the identification method proposed by Galli and particularly in the active loop make-up identification phase. Galli proposed the use of the reciprocal of the insertion loss of the identified echo path in order to limit the broadness of the far echoes. However, as previously pointed out that method is very sensitive to noise enhancement and this limits its application to loops up to 8–9 kft long. In fact, in Galli we estimated the noise power to be approximately −120 dBm/Hz but the real noise power on a loop (including crosstalk and other sources) may be even higher so that the actual range may be even lower. In accordance with the present invention, the problem of the noise enhancement is avoided because the reciprocal of the insertion loss is not used to determine the loop makeup.

c. Justification for the Proposed Approach

The waveform observed at the receiver after probing a loop with a signal is constituted by an unknown number of echoes, some overlapping some not, some spurious, some not, that exhibit unknown amplitude, unknown time of arrival and unknown shape. This problem is very complicated and has been seldom addressed in scientific literature. Due to these analytical difficulties, we took a different approach to solving the problem.

Given the availability of an accurate model of the physical phenomenon, the most reasonable choice for carrying out the identification process is to apply the Maximum Likelihood (ML) principle. The ML method is based on the idea that different populations generate different samples and that any given sample is more likely to have come from some populations than from others.

Similarly, our method hypothesizes a set of loop topologies and, on the basis of the mathematical model, computes the waveforms that should be observed at the receiver if the hypothesized topologies were true. The topology corresponding to the waveform that best matches the observed signal is chosen as the "most likely" topology. An index of the "closeness" between the hypothesized waveform and the observed one may be, for example, the Mean Square Error (MSE). In principle, if the model were exact and no form of noise were present, this procedure is able to identify exactly and flawlessly a loop. Obviously, noise is always present and the mathematical model, although precise, is not exact. Therefore, in practice, there is the possibility of making errors. An assessment of the probability of erroneous identification necessarily requires an extensive measurement campaign, especially field trials were impulse noise, crosstalk and non-ideal situations are often present.

However, in practice, the ML principle cannot be applied exactly as previously stated. In fact, it is very impractical to hypothesize a certain loop topology since the set of all the possible loops is too vast. A loop is constituted of several loop-sections made of different gauges and spliced together in a certain number of ways. There are only four possible gauge kinds (AWGs 26, 24, 22, 19) and only four main discontinuities (gauge change, bridged tap, co-located bridged taps, end of loop). The number of loop sections constituting a loop is limited to not more than 9 or 10 sections. However, the location of each discontinuity, i.e., its distance from the CO, is a parameter that can assume a set of non-numerable values. This is why it is impossible to apply the ML principle previously described to the set of all possible topologies.

A way to avoid this problem is to follow a step-by-step approach and apply the ML principle at every step. More in detail, discontinuities should be identified one at a time starting from the nearest one and ending with the last one. So doing, the ML principle will be applied at every step to identify a single discontinuity. In this way, the topology of the loop under investigation will be identified one section at a time and loop sections will be added to the hypothesized topology one at a time as well. However, the identification of a discontinuity will completely characterize the topology only up to the last identified discontinuity, whereas nothing could be said about whatever follows the last identified discontinuity. This implies that the loop section following the last identified discontinuity will not be identified in terms of length or gauge since this could only be accomplished when the discontinuity following that section will be observed and identified. This is a big problem since there is no way that the next discontinuity can be identified if no hypothesis is made on the loop section that precedes that discontinuity. However, a simple way of solving this problem is to hypothesize that the loop section that follows the last identified discontinuity is constituted of an infinitely long loop. This will allow us to identify the following discontinuity since the behavior of that loop section will certainly be different from the behavior of a loop section that has no discontinuities at all. Moreover, the hypothesis of an infinitely long loop section will also be useful in the elimination of the always present slowly decaying signal.

This step-by-step approach is advantageous for at least two reasons. First, the nearest discontinuities are the easiest to detect since they generate stronger echoes and these echoes are not hidden by other echoes. Secondly, once a discontinuity has been identified, its echoes (both real and spurious) can be subtracted from the observed waveform so that the two important problems of overlapping echoes and of the presence of spurious echoes are simultaneously solved.

Interestingly, the ML procedure adopted for our method is similar, in principle, to the ML estimation of the sequence of the states of a Markov chain in additive noise. As it is well known, a recursive solution to this problem is given by the Viterbi algorithm. The Viterbi algorithm computes all the admissible transmitted sequences and chooses as the transmitted one the one that is "nearest" to the observed signal in an Euclidean sense. The Viterbi algorithm is optimal in the sense that the decided sequence is the nearest sequence to the received one. From this point of view, it is reasonable to say that our method is optimal in the sense that the decided topology is the topology that generates the waveform that is nearest to the observed one. It is worth pointing out that this is not the same thing of stating that the decided topology is the nearest topology to the real one. In fact, in order to formally prove this it is necessary to introduce a metric in the space of the loop topologies and the definition of this metric is not straightforward.

d. Method Steps for Loop Identification

Figure 17A:
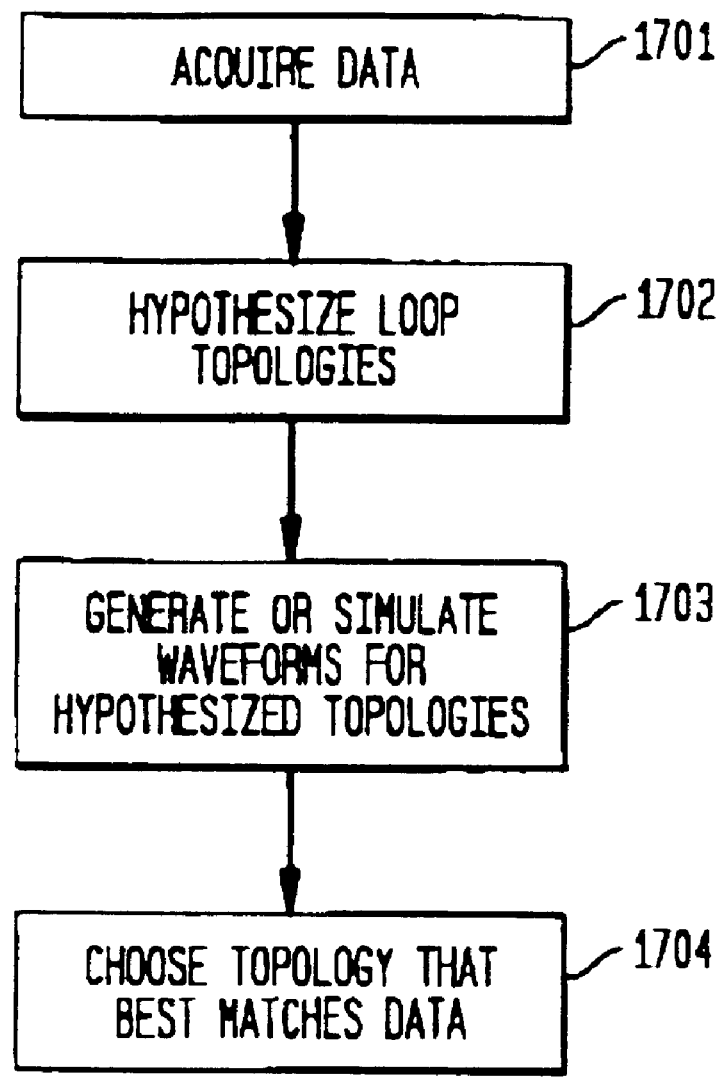
FIG. 17A is a high level flow chart that depicts the method steps of the present invention.

Turning now to FIG. 17A, there is shown a high level flow chart depicting the essential method steps of the present invention. In general, given a set of acquired data from step 1701, our method proceeds as follows we hypothesize a set of loop topologies 1702 and, on the basis of the mathematical model, compute the waveforms that should be observed at the receiver if the hypothesized topologies were true 1703. The topology corresponding to the waveform that best matches the observed signal is chosen as the "most likely" topology 1704.

Figure 17B:
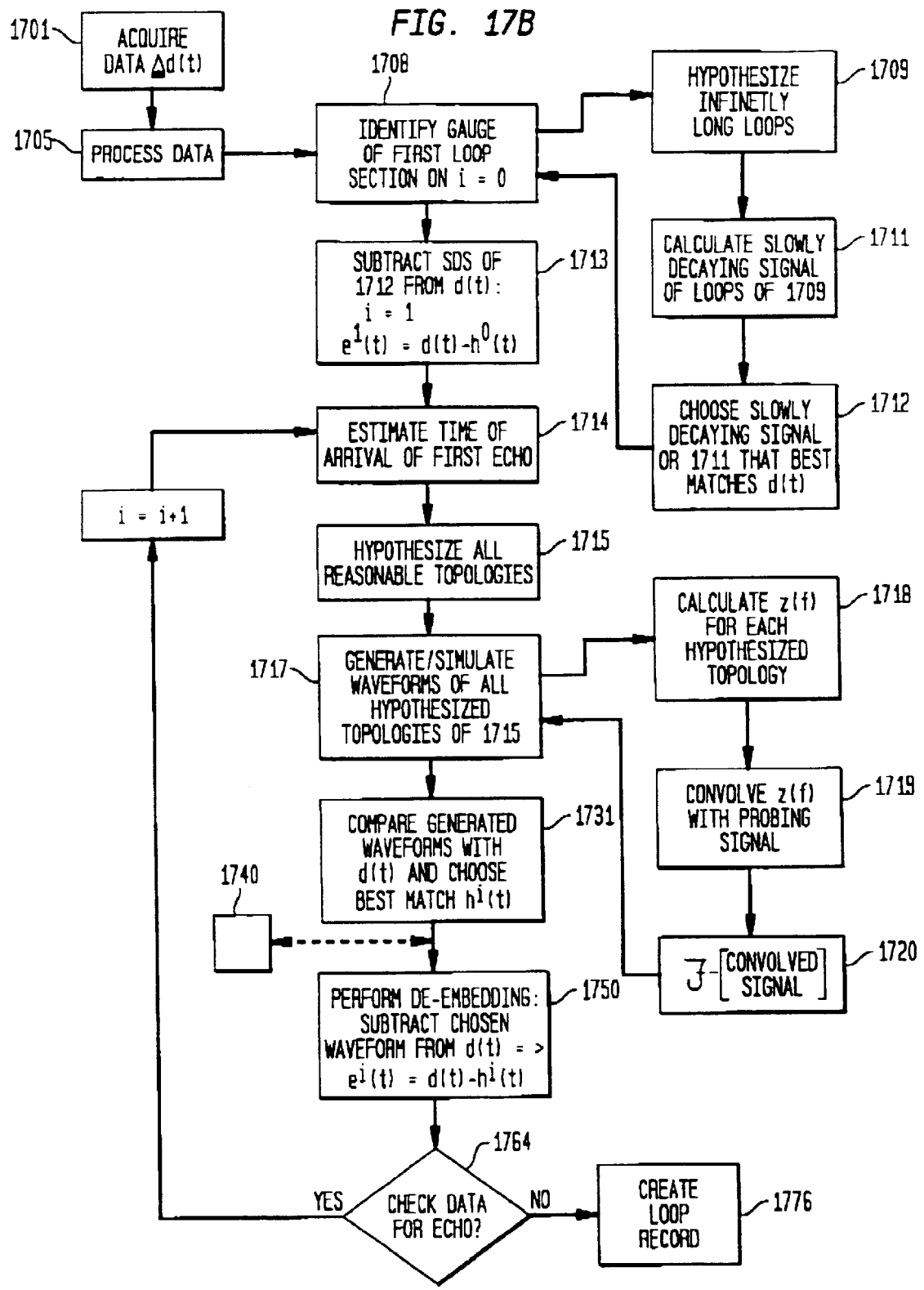
FIG. 17B is a specific embodiment of the flow chart of FIG. 17A.

Turning to FIG. 17B there is shown a specific embodiment of the high level flow chart of FIG. 17A. Specifically, at step 1701 the process begins by acquiring data. The process for acquiring data essentially comprises repetitively sending pulses of varying pulse widths onto the loop and receiving the echo responses generated by discontinuities on the loop, i.e., the signal of the echo responses comprising the acquired data. In our notation the acquired data is represented by vector d(t).

It is necessary to probe the medium with probing signals of different width for several reasons. The width of the pulse determines our blind zone, i.e., the zone where discontinuities cannot be detected. In fact, it is impossible to detect echoes as long as the probing pulse lasts. This implies that narrow pulses are necessary to detect near discontinuities. On the other hand, broad pulses are necessary to detect far discontinuities, since there is not enough energy in narrow pulses to reach the end of long loops. We have ascertained from our measurements that a square pulse of different widths is sufficient to identify loops within 18 kft. In our work we have found pulses having widths of 500 ns, 1 $\mu$s, and 5 $\mu$s to be adequate. The 500 ns pulse implies that the first discontinuity that can be detected is located at approximately 160 ft from the CO.

Square pulses provided very good results in our measurements. However, their use may be limited in the field if certain switches are present in the CO. In fact, some switches may exhibit a low-pass filtering behavior so that pulses with narrower bandwidth should be used in these situations.

From the foregoing, during the data acquisition phase 1701 several snapshots of the medium will be taken. In general, the snapshots corresponding to the narrower pulses will be analyzed first and the snapshots corresponding to the broader pulses will be analyzed afterwards.

Once the data is acquired, the next step is data processing 1705. Data processing comprises many steps as FIG. 17 shows. We will now describe each of those steps in detail.

The first step in processing the data is identifying the gauge of the first loop section 1708, i.e., the loop section attached to or immediately following the CO or measurement equipment. In accordance with our method identifying the first loop section gauge comprises substeps 1709, 1711, and 1712.

At substep 1709 an infinitely long loop is hypothesized. In so doing, four loop topologies are hypothesized, one for each gauge kind, i.e., one each for AWG 19, 22, 24, and 26 cable. In general, any slice can be used as long as the metrics are computed on the slowly decaying signal only. The loop impedance response of the infinitely long loop is based on the model discussed previously in section 1.a; in fact, refer to FIG. 14 for examples of the loop impedance response for infinitely long loops.

At step 1711 the slowly decaying waveform for each of the hypothesized infinitely long loops is then calculated, block 1711. The details of calculating the slowly decaying waveform of a loop have been fully explored in section 1.a.

Once the slowly decaying waveform for each hypothesized infinitely long loop is calculated, as in step 1711, the slowly decaying waveform that best matches d(t), or the data slice, is chosen as the waveform representing the first loop section, step 1712. In effect, the gauge of the slowly decaying waveform that best matches the data slice is chosen as the gauge of the first loop section.

With the gauge of the first loop section identified, step 1708, the method then proceeds to step 1713. At 1713 the slowly decaying signal (SDS) or waveform (SDW) that represents the first loop section is subtracted from d(t). That is, if in general $h^{(1)}(t)$ is the simulated waveform corresponding to the identified topology $T^{(1)}$ at step i, then $e^{(1)}(t)=d(t)-h^{(i-1)}(t)$, the difference between the acquired or real data waveform and the simulated waveform corresponding to the identified topology $T^{(i-1)}$. At this step in processing, prior to processing the echo corresponding the first discontinuity, $h^{(i-1)}(t)$ would correspond to the slowly decaying waveform that best matches the data slice; specifically, i=1, and $e^{(1)}(t)=d(t)-h^{(0)}(t)$, where $h^{(0)}(t)$ represents the chosen SDS at 1712. As such, $e^{(1)}(t)$ represents the acquired waveform without the slowly decaying waveform. At this stage of the process $e^{(1)}(t)$ can be thought as being representative of compensated data, i.e., the data has been adjusted to compensate for the inductive behavior of the loop.

With the effects of the decaying waveform, or conversely the effects of the inductive behavior of the loop, compensated for, the remaining task essentially comprises looking at the echo responses making up the remaining acquired data, matching those acquired echo responses to echo responses predicted by the model of section 1.a, and, once the predicted echo response matches the actual echo response within an error margin, identifying the discontinuity that causes the echo.

Accordingly, processing continues with estimating the time of arrival of the first echo, step 1714. The estimation of the time of arrival of an echo is of fundamental importance. In fact, since the velocity of propagation of an electrical signal on a twisted-pair is known (approximately equal to 0.66·c, where c is the speed of light in vacuum) the knowledge of the time of arrival of an echo allows us to determine the location of the discontinuity. If τ is the time of arrival of the detected echo, the location of the corresponding discontinuity may be computed as follows:

$$l = \frac{1}{2} v \cdot \tau,$$

where v is the velocity of propagation of the echo and the factor ½ takes into account the fact that the signal has traveled round-trip from the CO to the discontinuity. In more detail, the speed of an electrical signal on a twisted-pair depends on the kind of gauge, although these speeds are very close. In general, signals travel faster on thicker cable than on thinner ones. So, when estimating the location of a discontinuity a precise estimate would involve the calculation of the travelling time of the echo along each different loop section, i.e., considering different velocities of propagation for each loop section.

As the identification process goes on, it is possible that some small errors in the estimation of the location of the first discontinuities add up and cause larger errors in the estimation of the location of the following discontinuities. This fact may not be a serious problem, since errors of a few hundred feet are certainly not critical on loops as long as several thousand feet. However, if this error grows too much it may cause problems in the choice of the correct topology and jeopardize the correct identification of the loop. For this reason, it is important to accurately estimate as much as possible the time of arrival. We have found in our work that process is more accurate if the time of arrival estimation is done at two different moments. First, a rough estimate is performed at step 1714 and, afterwards, this estimate is refined at step 1740. It is noted that step 1740 is optional because it may be possible to accurately estimate the time of arrival at step 1714 using more sophisticated data processing techniques. Furthermore, accuracy is a relative concept and we have found that additional accuracy in the time of arrival did not lead errors in loop make-up identity in the vast majority of cases we tested.

With the time of arrival estimated we then hypothesize a representative set of reasonable topologies that could match the next discontinuity 1715. In our notation the set of all hypothesized topologies for the $I^{th}$ echo, or iteration through the method steps, is represented by $\{T_j^{(1)}\}$. There are a finite number of possible topologies that can be hypothesized, and this number is also small. This suggests that a simple exhaustive search through all the possible topologies could be performed without requiring a prohibitive computational burden. However, several tens of topologies may be possible in some cases such as several co-located bridged taps. In this case, it could be useful to organize the topologies in "families" or clusters and chose the two topologies (sample topologies) that exhibit the most "distant" waveforms. In this way only two topologies per cluster would be tested, thus reducing the computational burden. Once this preliminary test has been performed, the sample topology that best matches the observations will define the family of topologies that most likely contains the best topology. At this point we would limit the search for the best topology within that family of topologies. The set of hypothesized topologies depends on the sign of the detected echo and on the previously identified discontinuity.

Obviously, if some a priori knowledge on the statistical distribution of the loop sections is known, the search could be performed more efficiently. In fact, the most recurrent topologies may be hypothesized first so that the time needed for the determination of the gauge or for the determination of the kind of discontinuity can be reduced. A partial statistical characterization of the loop plant could be obtained by analyzing the loop records of the CO under test contained in the LFACS database.

Also discontinuities encountered before the discontinuity currently under identification determine the possible topologies that can be identified. In particular, two cases have to be considered: the case when a previous bridged tap has already been thoroughly identified (both in location and length) or if the bridged taps have only been located but their length is still unknown. In the following, these two cases will be referred to as "closed" or "open" bridged tap cases, respectively. The reason why it is important to discriminate between the two cases of open and closed bridged taps is due to the fact that a bridged tap always generates a pair of echoes, a negative echo followed by a positive echo. However, it is not necessarily true that the positive echo immediately follows the negative one. For this reason, once a bridged tap is located it has to be taken into account that the next observed echo might be generated either by the end of the bridged tap or by some other new discontinuity.

Finally, all the loop sections share the property of being considered constituted of infinitely long sections that for now are of unknown length.

A simulated waveform that represents each hypothesized topology is then generated 1717 according to the mathematical model of section 1.a. The process for simulating a waveform for topology 1717 is given by steps 1718 through 1720. First, the input impedance of each hypothesized loop topology is calculated as a function of frequency 1718. The calculated input impedance of each hypothesized loop topology is then convolved, in the frequency domain, with the Fourier transform of the probing signal 1719. Finally, a simulated waveform for each hypothesized loop topology is obtained in the time domain by inverse Fourier transforming the result of the convolution 1720. As previously indicated, by our notation $\{h_j^{(i)}(t)\}$ represents the set of all the simulated waveforms (j=1, . . . $N^{(i)}$) corresponding to the set of all the possible hypothesized topologies $\{T_j^{(i)}\}$.

We then compare the simulated waveforms of step 1717 to remaining acquired or observed data signal, $e^{(1)}(t)$, and choose the simulated waveform that best matches $e^{(1)}(t)$, step 1731. There are many ways to determine what constitutes the "best match" or has the smallest error margin. The topology corresponding to the waveform that best matches the observed signal is chosen as the "most likely" topology. An index of the "closeness" between the hypothesized waveform and the observed one may be, for example, the Mean Square Error (MSE). In principle, if the model were exact and no form of noise were present, this procedure is able to identify exactly and flawlessly a loop. Obviously, noise is always present and the mathematical model, although precise, is not exact. Therefore, in practice, there is the possibility of making errors. In our work we chose the MSE as the metric for comparing the real data waveform and the simulated ones. A set of $N^{(1)}$ MSEs is computed between the acquired data waveforms and the simulated data waveforms, i.e., $e^{(i)}(t)=(d(t)-h^{(i)}(t))$, and the $N^{(1)}$ differences $(\{h_j^{(i)}(t)\}-h^{(i-j)}(t))$ between the waveforms pertaining to all the discontinuities topologies at step i and the waveform corresponding to the discontinuity topology identified at the (i−1)-th step.

The waveform contained at step 1731 is then subtracted from the remaining acquired data 1750. i.e., by de-embedding. Thus in accordance with our notation the remaining signal would be given by $e^{(i)}(t)=d(t)-h^{(i-1)}(t)$.

The process then continues by checking for the existence of another echo, 1760. If the signal level indicates the existence of another echo, the process returns to step 1714; otherwise a loop record is created as at step 1764.

Note that, similar to Galli, the basic idea of proceeding step-by-step in the identification of the loop discontinuities and of stripping off the effect of near discontinuities from the far ones is still valid, but the way these effects are stripped off from the observation is different. This "de-embedding" technique is more effective than that described in Galli because it would not suffer the problems of noise enhancement due to the use of the reciprocal of the insertion loss. Moreover, since a frequency domain reflection description is the composite of all the signals reflected by the discontinuities over the measured frequency range, the signal that is subtracted from the acquired data will also contain all the spurious echoes generated up to the last identified discontinuity. This avoids the use of the time domain model for spurious echoes where all the spurious echoes have to be generated one by one and then subtracted from the acquired data order to be removed.

This method, in contrast to Galli which uses the reciprocal of the insertion loss, will not modify the broadness of the received echoes. However, this is not a problem because, after having removed all the previous echoes, we are sure that the echo pertaining to the next discontinuity will be the first one to appear and will not be hidden by the previous ones. It is important to point out that, since this method uses a frequency domain model, the IFFT of the input impedance will contain both the real and the spurious echoes, thus making the de-embedding complete. Finally, in accordance with this aspect of our invention and in contrast to Galli we can identify loops of any topology.

2. Circuitry for Improving the Detection of Weak Echoes

The method described in the preceding section 1 improves the reach and accuracy of single ended metallic measurements methods by formulating a more accurate model of the behavior of the signals that are used to make the measurement. Specifically, the method took into account the inductive behavior of the loop and compensated for its effect on the measurements. In addition, the previously described method used the frequency domain representation of the discontinuities to overcome noise enhancement in the time domain. During the course of our work, we also found that we can further improve performance through the use of differential probing. In this section 2 we will now describe our differential probing circuitry and provide an example of the improvements that may be obtained by use of our circuitry when used in conjunction with the method of section 1.

Figure 18:
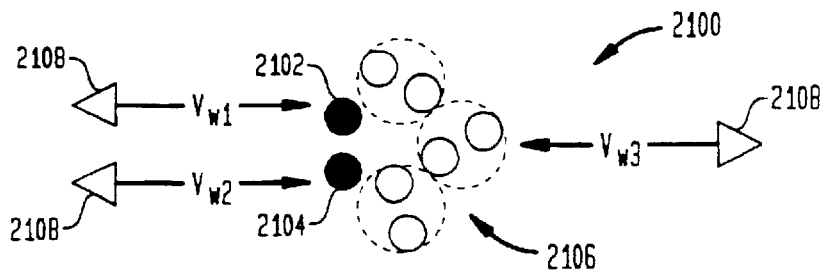
FIG. 18 depicts the cross-section of a multi-pair twisted cable pair.

Multi-pair twisted pair cables exhibit more complex behavior than simple cables often characterized using time-domain reflectometry. FIG. 18 illustrates the cross-section of a multi-pair twisted pair cable 2100 which includes a test pair consisting of wires 2102 and 2104, a plurality of inactive pairs 2106 and a ground path 2108. It is desirable that the inactive pairs do not affect measurements performed on the test pair. Wires 2102 and 2104 have voltages $V_{w1}$ and $V_{w2}$ relative to ground 2108, respectively. The inactive pairs 2106 are assumed to be equipotential at voltage $V_{w3}$ for the purposes of analysis. This system of conductors can support three propagating modes (low frequency or Transverse Electric and Magnetic (TEM) approximation) which can be described by:

$$V^+ + V^- \equiv \begin{pmatrix} V_{dif} \\ V_{pr} \\ V_{cm} \end{pmatrix} = \begin{bmatrix} 1 & -1 & 0 \\ \frac{1}{2} & \frac{1}{2} & -1 \\ \frac{1}{2}\theta & \frac{1}{2}\theta & 1-\theta \end{bmatrix} \begin{pmatrix} V_{w1} \\ V_{w2} \\ V_{w3} \end{pmatrix} \equiv AV_c \quad (6a)$$

and $$I^+ - I^- \equiv \begin{pmatrix} I_{dif} \\ I_{pr} \\ I_{cm} \end{pmatrix} = \begin{bmatrix} \frac{1}{2} & -\frac{1}{2} & 0 \\ 1-\theta & 1-\theta & -\theta \\ 1 & 1 & 1 \end{bmatrix} \begin{pmatrix} I_{w1} \\ I_{w2} \\ I_{w3} \end{pmatrix} \equiv BI_c \quad (6b)$$

The factor θ describes the shielding produced by the inactive pairs: complete shielding gives θ=0, while θ≈0.5 for twisted pair cable. It is useful to note that $B^{-1}=A^T$ and $A^{-1}=B^T$. Other test pair combinations can be treated by superposition.

Figure 19:
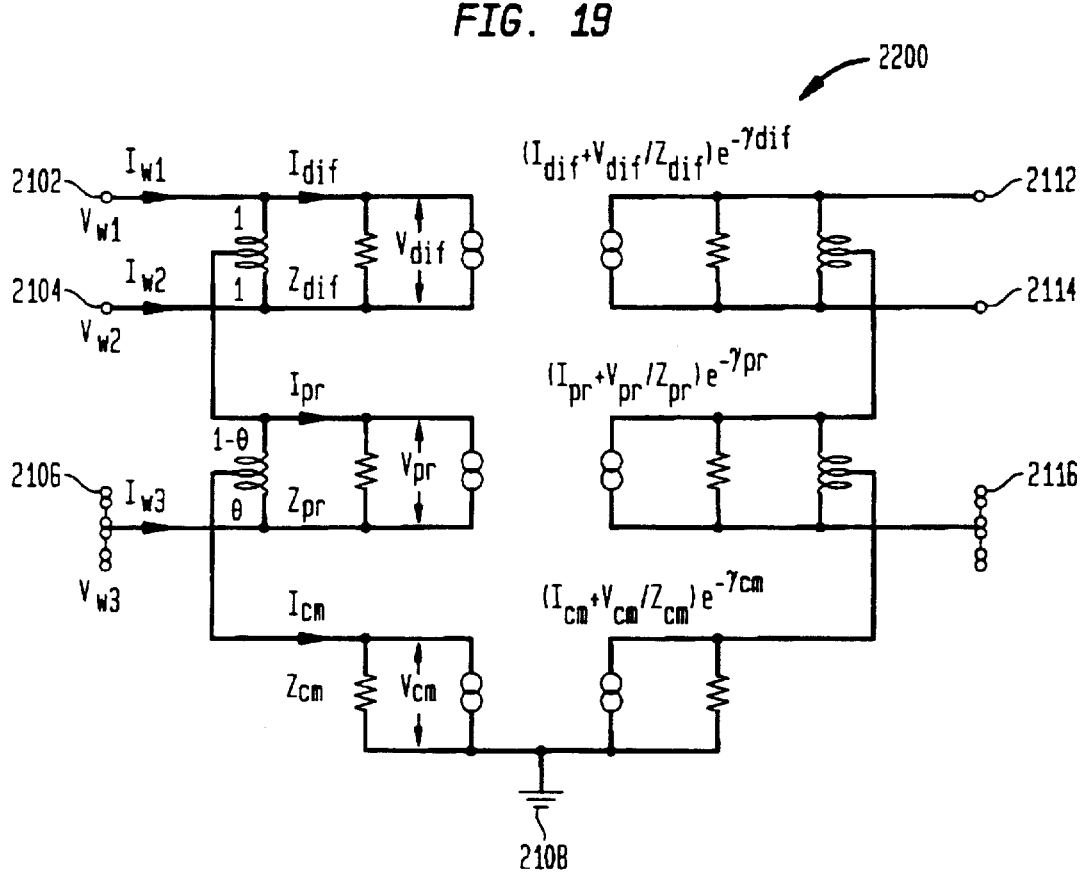
FIG. 19 depicts an equivalent circuit that describes the interaction of the propagating modes in the cable of FIG. 18.

FIG. 19 is an equivalent circuit which describes the interaction of the propagating modes in cable 2100 represented by eqns. 6(a) and 6(b). The terminals corresponding to the distal end of the cable are represented by nodes 2202, 2204 and 2206. $V_{w1}$ and $I_{w1}$ denote the voltage and current on wire 2102 (w1), etc. The differential mode $I_{dif}$ represents current confined to wires 2102 (w1) and 2104 (w2) and is generally the desired signal. The mode $I_{pr}$ represents current flowing between the plurality of inactive pairs 2106 (w3) and the test pair of wires 2102 and 2104. The two modes $I_{dif}$ and $I_{pr}$ are well confined to the cable and consequently exhibit low attenuation. The characteristic impedances associated with these modes are typically $Z_{dif}$=100–900 Ω and $Z_{pr} \approx$ 20–75 ΩQ, respectively. The net cable current $I_{cm}$ is another common-mode signal associated with both radiated emissions and noise pick-up, and is highly dependent on cable installation. The characteristic impedance of this lossy mode $Z_{cm}$ is variable and not readily characterized. Excitation of the inter-pair mode and cable common mode can adversely affect measurement of differential mode signals.

There are six propagating voltages and currents related by $V_1^+ = Z_0 I_1^+$ and $V_1^- = Z_0 I_1^-$, where $Z_0$ is the diagonal matrix of characteristic impedances.

Discontinuities in the cable due to imperfections, interconnections or cable mismatch can induce undesirable coupling between all three modes. Consider a semi-infinite cable which is excited by a purely differential incident traveling-wave $I_-^+ = (I_{dif}^+, 0, 0)^T$ and whose termination is represented by an impedance matrix $Z_{term}$. The boundary condition in this case is $V_{c1} = Z_{term} I_{c1}$. The reflected wave $I_1^-$ may contain additional common-mode components $I_{pr}$ and $I_{cm}$. Expressed in terms of the propagating modes using Eq. (6), the current and voltages satisfy $I_1^+ - I_1^- = BI_{c1}$ and $V_1^+ + V_1^- = AZ_{term} I_{cl}$ at the termination. Combining these relations yields:

$$(Z_0 + AZ_{term}A^T)I_1^- = (AZ_{term}A^T - Z_0)I_1^+ \qquad (7)$$

Standing waves can occur with each of the three fundamental modes and adversely affect measurements. Reflections are suppressed when $AZ_{term} A^T = Z_0$. Using the symmetry between A and B noted earlier, this can be expressed as $Z_{term} = B^T Z_0 B$, which is just the impedance looking into an infinitely long cable.

Another important case is mode coupling in a cable interrupted by co-located impedances in series with each wire. This is equivalent to the termination $Z_{term} = Z_{se} + B^T Z_0 B$ where $Z_{se}$ is a diagonal matrix whose elements are the series impedances. Using Eqn. 7, the reflected wave $I_1^-$ in this case satisfies $$(Z_0 + 1/2 A Z_{se} A^T) I_1^- = 1/2 A Z_{se} A^T I_1^+ \qquad (8)$$

The transmitted wave in the cable beyond the position of $Z_{se}$ is $I_2^+ = I_1^+ - I_1^-$. Eqn. (8) has the iterative solution $$I_1^- = \sum_{n=0}^{\infty} (-1)^n (1/2\ Z_0^{-1} A Z_{se} A^T)^{n+1} I_1^+.$$

For a single resistance $R_{se}$ in series with wire 1 or wire 2, Eqn. 8 reduces to $$\frac{I_{pr}}{I_{dif}^+} = \frac{R_{se}}{4Z_{pr}} \left(1 + \frac{R_{se}}{2Z_{dif}} + \frac{R_{se}}{8Z_{pr}} + \frac{\theta^2}{8Z_{cm}}\right)^{-1}, \qquad (9)$$

which has little dependence on $Z_{cm}$, and $$\frac{I_{cm}}{I_{pr}} = \frac{\theta Z_{pr}}{Z_{cm}}, \qquad (10)$$

which is independent of $R_{se}$.

A cable interrupted by localized shunt conductances between the wires and to ground can be described by $I_{c1} = I_{c2} + Y_{sh} V_{c1}$ with $V_{c1} = V_{c2}$, where the subscripts c1 and c2 denote the two sections of the divided cable. One can show in this case that $$\left(1 + \frac{1}{2} B Y_{sh} B^T Z_0\right) I_2^+ = I_1^+ \qquad (11)$$

and $I_1^- = I_2^+ - I_1^+$. A single shunt conductance $Y_{sh}$ from wire 1 to ground produces a common-mode current $I_{cm}/I_{dif}^+ \approx Y_{sh} Z_{dif}/4$, which does not benefit from shielding by the other pairs. A shunt conductance placed between the conductors does not degrade CMR. Based on Eqn. 11, the common-mode rejection is:

$$\frac{I_{cm}}{I_{dif}^+} \cong \frac{\theta}{2} \frac{Z_{se}}{Z_{cm} + Z_3} + \frac{Y_{sh} Z_{dif}}{2} \frac{Z_3}{Z_{cm} + Z_3}. \qquad (12)$$

Figure 20:
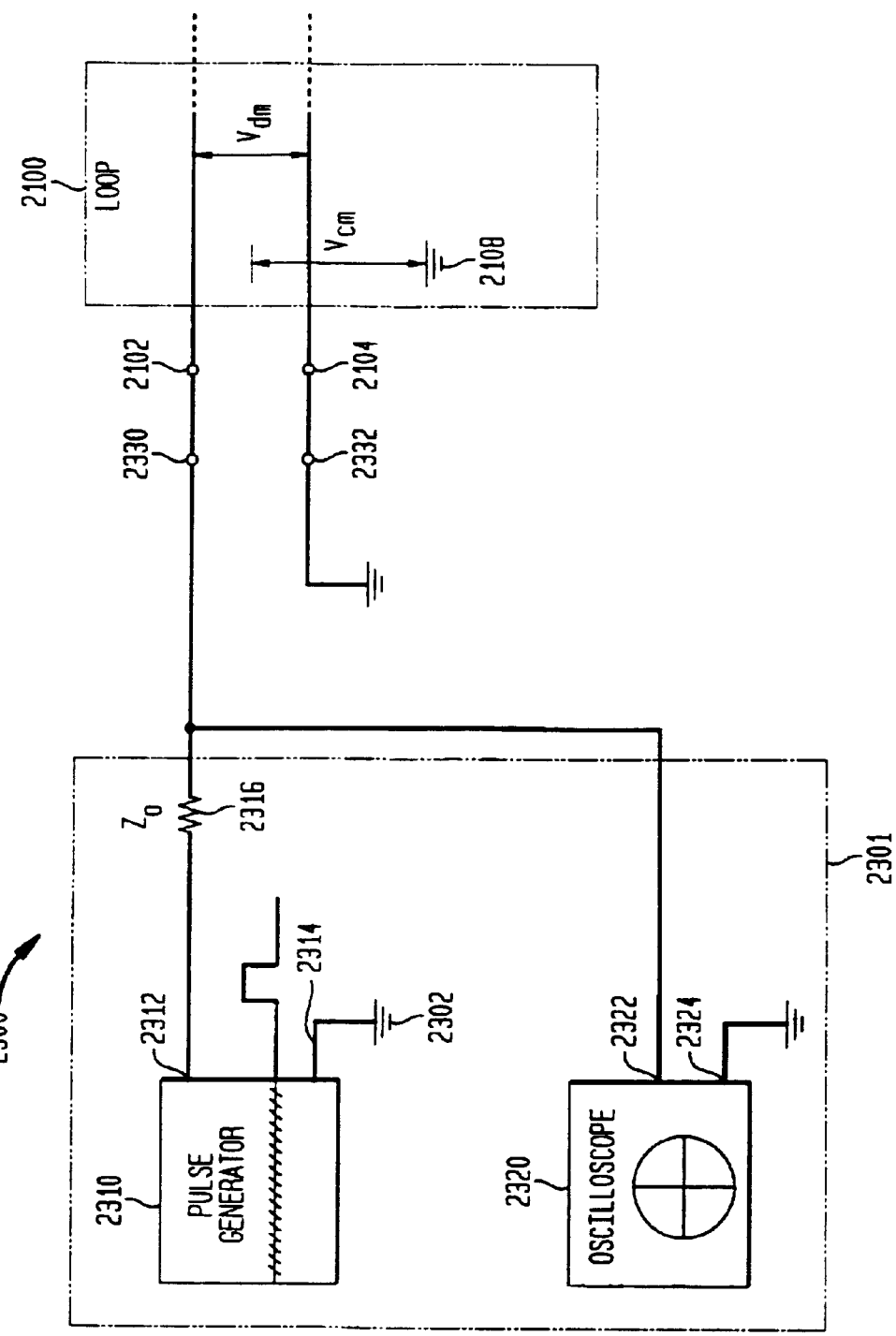
FIG. 20 depicts a prior art application of conventional TDR methods to measure one pair of a multi-pair cable.

FIG. 20 illustrates an application of conventional TDR methods to measure one pair of a multi-pair cable. This figure includes loop 2100 and a test system 2301 consisting of pulse generator 2310 and oscilloscope 2320. The test system has terminals 2330 and 2332 connected to wires 2102 and 2104 of loop 2100, respectively. Pulse generator has single ended output 2312 which is connected through an output impedance $Z_0$ 2316 to terminal 2330, and signal return 2314. Oscilloscope 2320 has input 2322 connected to terminal 2330, and signal return 2324. There is a system ground 2302 to which both signal returns and terminal 2332 are connected. System ground 2302 may not coincide with cable ground 2108. With this method, an unbalanced signal is applied to wires 2102 and 2104 which excites all three cable modes described previously in eqns. 6–12. The oscilloscope also responds to signals from all three modes.

Figure 21:
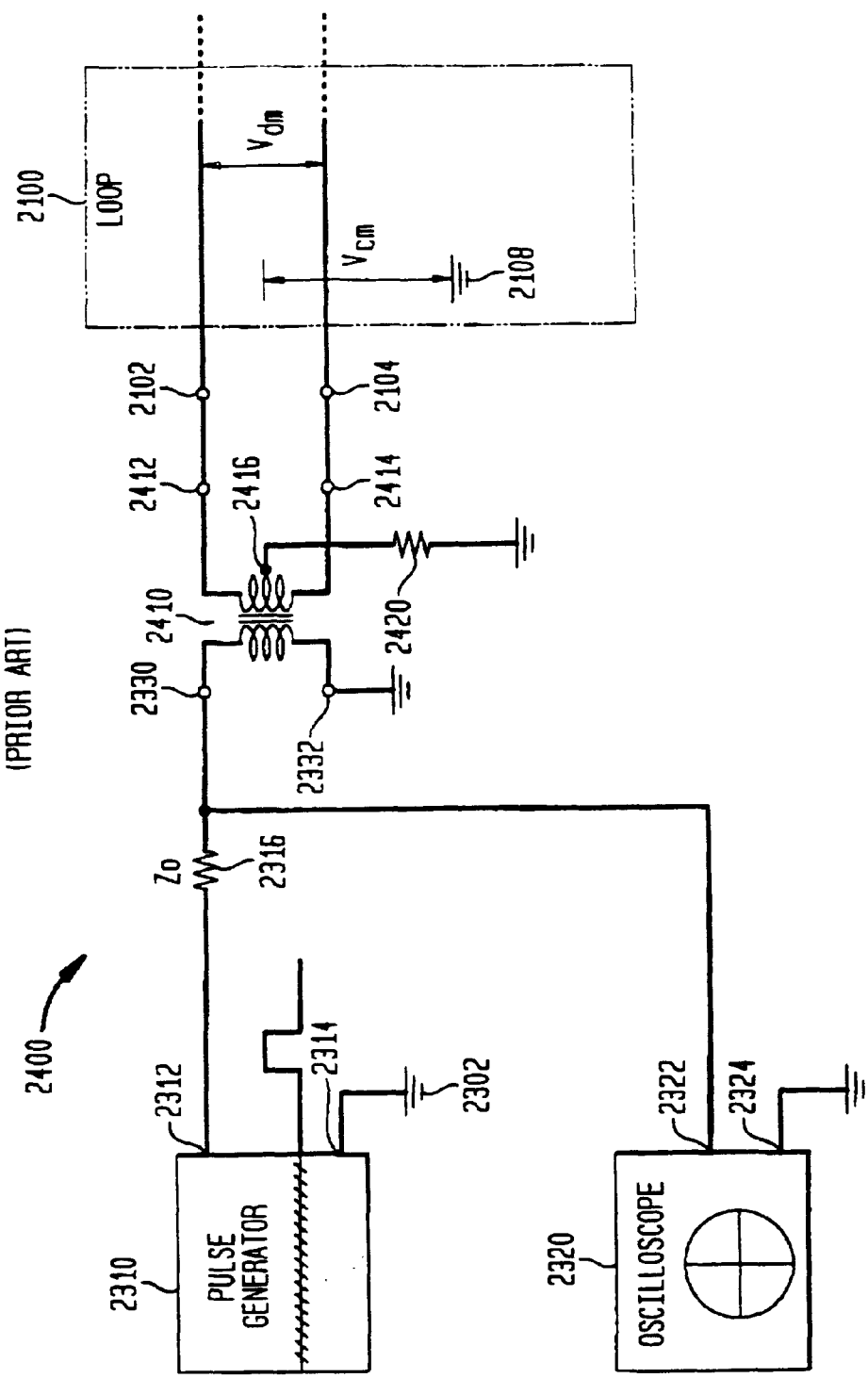
FIG. 21 illustrates a prior art improvement of the circuit of FIG. 20.

FIG. 21 illustrates an improvement of the prior art that partly alleviates common mode interference. FIG. 21 includes the circuit of FIG. 20 with the addition of transformer 2410 and termination resistor 2420. The primary side of transformer 2410 is connected between terminals 2330 and 2332. The secondary of transformer 2410 has balanced outputs 2412 and 2414 and center tap 2416. The balanced outputs are connected to loop access terminals 2102 and 2104. Center tap 2416 is connected to system ground 2302 through resistor 2420. Transformer 2410 converts single ended signals appearing at terminal 2330 into a differential signal applied between 2102 and 2104. Differential signals are also converted to single ended signals for display on the oscilloscope. Resistor 2420 can terminate common mode signals appearing on the test pair. It is often true that this resistor has a value of $Z_{dif}/4$. The transformer has a limited low frequency response that restricts the use of this approach to short loops.

Figure 22:
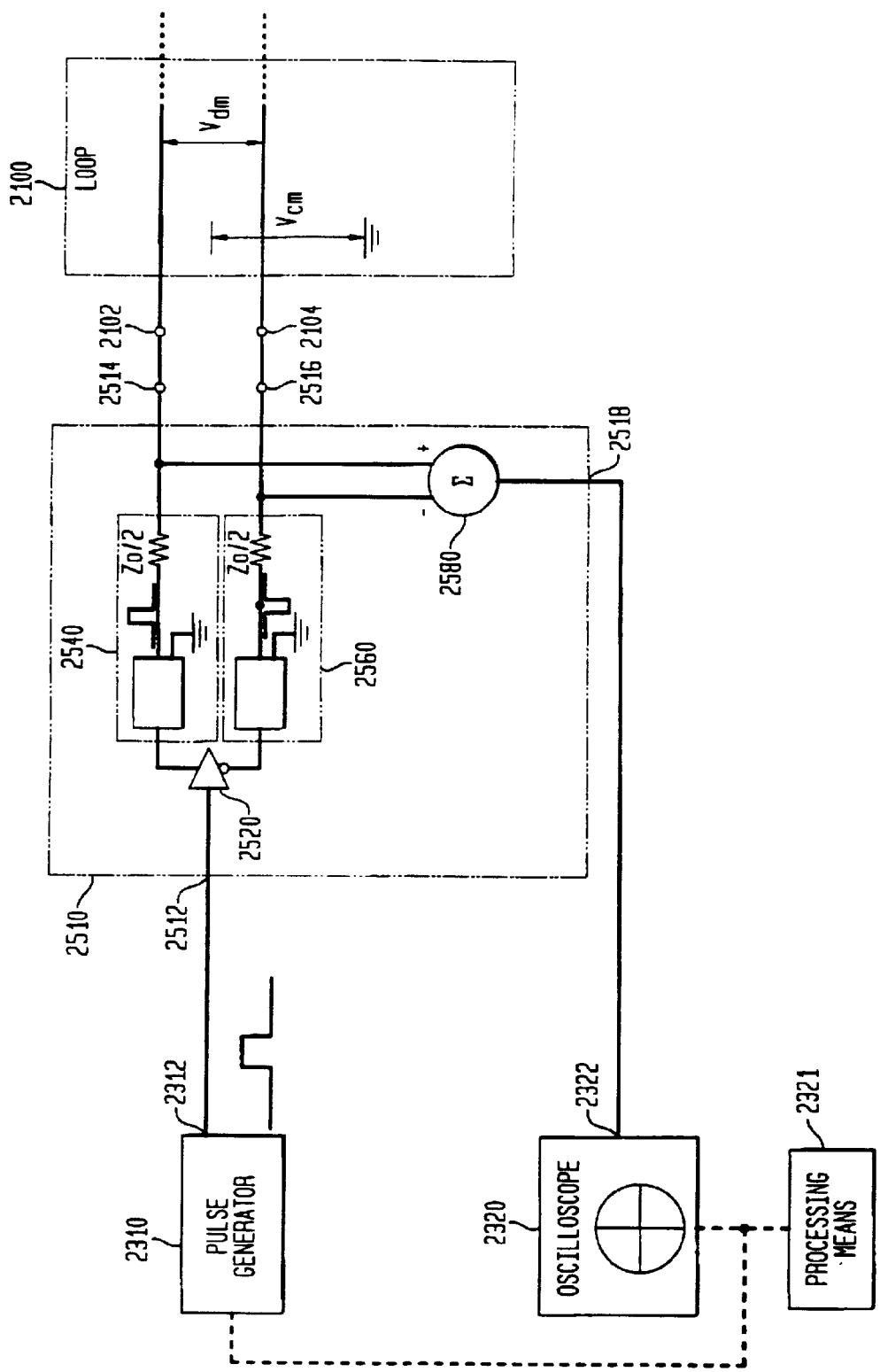
FIG. 22 illustrates a block diagram of a system that performs broadband differential time domain measurements in accordance with an embodiment of the present invention.

FIG. 22 illustrates a block diagram of a system which performs broadband differential time-domain measurement in accordance with an embodiment of our invention. FIG. 22 includes waveform generator 2310, sampling head 2510, oscilloscope 2320 and loop plant 2100. Sampling head 2510 has input port 2512 connected to output 2312, loop test points 2514 and 2516 connected to loop access terminals 2102 and 2104, respectively, and output port 2518 connected to oscilloscope input 2322. Sampling head 2510 includes buffer amplifier 2520, positive pulse generator 2540, negative pulse generator 2560 and difference amplifier 2580. Pulse generators 2540 and 2560 each have an output impedance $Z_0/2$ and are connected to terminals 2514 and 2516, respectively. The differential impedance seen looking into terminals 2514 and 2516 is $Z_0$.

Waveform generator 2310 may, for example be a pulse generator. The waveform appearing at output 2312 is converted by amplifier 2520 with positive pulse generator 2540 and negative pulse generator 2560 into complementary signals which are presented to terminals 2514 and 2516. Complementary signals provided at terminals 2514 and 2516 preferentially excite a differential mode in loop plant 2100 and minimize excitation of the several common mode signals. Reflected differential mode signals appearing at terminals 2514 and 2516 are measured by difference amplifier 2580 and absorbed or terminated by the output impedances $Z_0/2$. Optimal termination occurs for $Z_0 = Z_{diff}$. Difference amplifier 2580 measures the differential mode signal appearing across terminals 2514 and 2516 while rejecting common mode signals which may be present. Oscilloscope 2320 records the excitation waveform and resulting reflected waveforms. Sampling head 2510 accomplishes the measurement objectives without the inherent low-frequency limitation of the prior art. A precisely controlled differential excitation can be applied to the test pairs and the resulting echoes can measured with little additional distortion. This greatly simplifies the analysis of the measured pair response, as would be done by our method described above in processor 2321.

It should noted that although an oscilloscope 2320 is depicted in FIG. 22 an oscilloscope is only illustrative. In accordance with our invention, oscilloscope 2320 is any device that includes the functions of detecting the signals described throughout the present invention, e.g., a receiver, and of displaying such signals. In fact, signal display is optional where the operator desires loop make-up identification or a record. In such an implementation, the display is not necessary and the detected signals can be stored in any number of ways, e.g., on a hard drive coupled to the receiver, a diskette or CD-rom drive coupled to the receiver, or the capability to transmit the data to some other device so that processing can take place. Nonetheless, in a TDR type implementation we expect processor means 2321, the detection function and the displaying function provided by oscilloscope 2320, and the pulse generator 2310 to be included in a single device that may also include our sampling head 2510. In addition, it is also quite possible that sampling head 2510 may be made as a stand alone unit and used as an attachment to present day TDRs.

Figure 23:
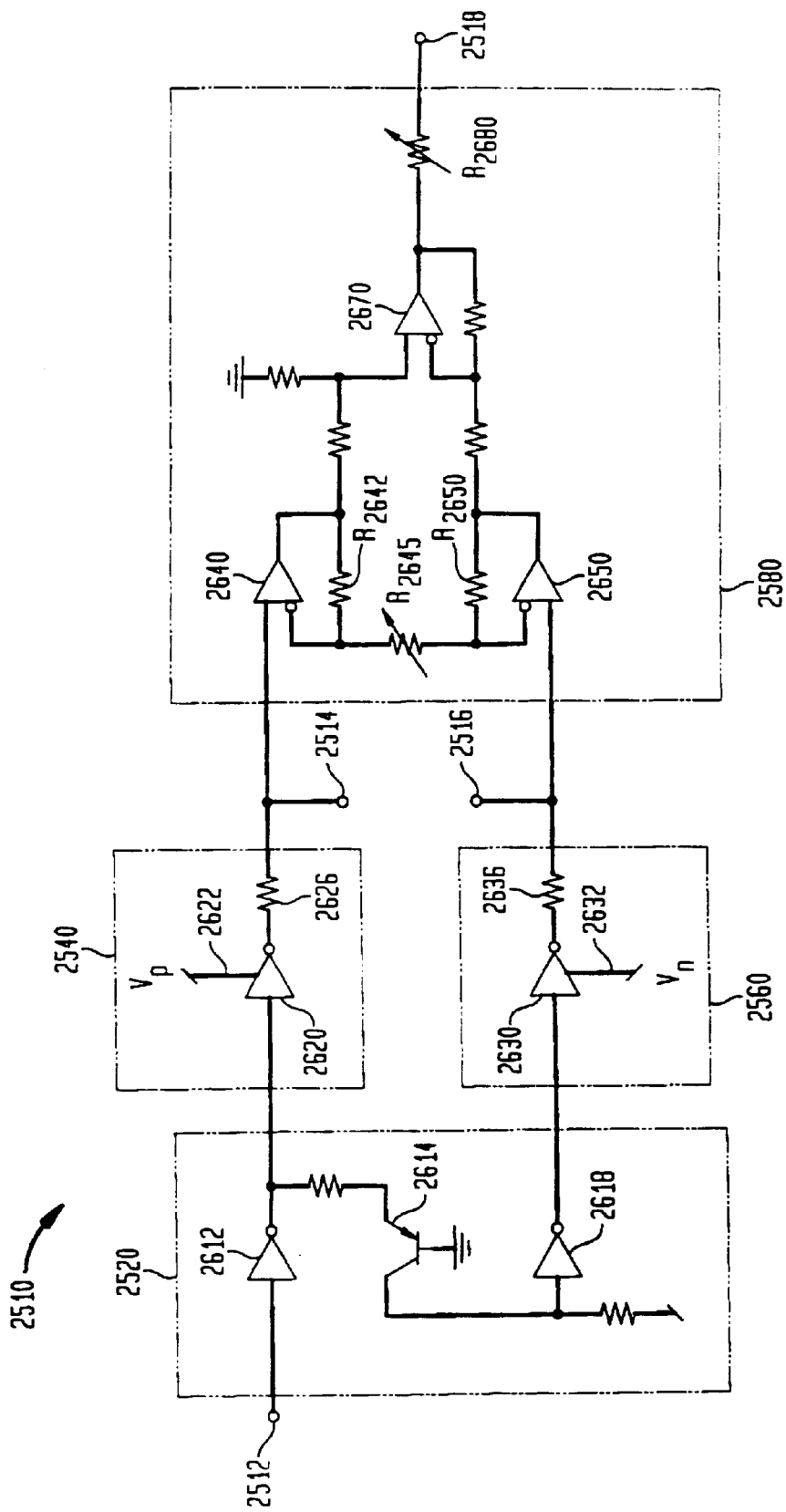
FIG. 23 illustrates an implementation of the broadband differential time-domain sampling head in accordance with an embodiment of the present invention.

FIG. 23 illustrates an implementation of the broadband differential time-domain sampling head 2510 in accordance with an embodiment of the invention. As shown, sampling head 2510 comprises input buffer amplifier 2520, positive pulse generator 2540, negative pulse generator 2560, difference amplifier 2580 and has input 2512, positive loop test terminal 2514, negative loop test terminal 2516 and measured signal output 2518. Input buffer amplifier 2520 generates complementary signals for driving pulse generators 2540 and 2560 and comprises inverter 2612, level translation 2614 and inverter 2618. Positive pulse amplifier 2540 comprises inverter 2620 and series resistors 2626, while negative pulse generator 2560 comprises inverter 2630 and series resistors 2636. Inverter 2620 has positive bias $V_n$ 2622, while inverter 2630 has negative $V_n$ 2632.

Inverter 2612 receives input from output 2312 via terminal 2512. The output of inverter 2612 directly drives the input of inverter 2620 and indirectly drives the input of inverter 2618 through level translation 2614. The output of inverter 2618 drives the input of inverter 2630. The output of inverter 2620 drives loop test terminal 2514 through series resistor 2626, while inverter 2630 drives loop test terminal 2516 through series resistor 2636.

Complementary signals appear at the output of inverters 2620 and 2630. The outputs of inverters 2620 and 2630 are nominally at zero potential in the absence of an input pulse. In one embodiment, input 2512 is provided a fixed amplitude positive pulse of duration $\tau$, which produces a positive going excursion of duration $\tau$ at loop test terminal 2514 and a negative going excursion of duration $\tau$ at loop test terminal P 2516. The complimentary positive and negative going excursions excite a differential mode signal on the loop, while minimizing excitation of common mode propagation. In one embodiment, inverters 2620 and 2630 comprise high-speed CMOS inverters, in which case the positive and negative output pulse amplitudes are controlled by the value of the bias voltages $V_p$ and $V_n$ applied to 2622 and 2632, respectively. In another embodiment, inverters 2620 and 2630 comprise a plurality of individual inverters whose outputs are connected to the respective loop test terminals through a plurality of independent series resistors so as to effect equal current sharing among said individual inverters. In yet another embodiment, inverters 2612, 2618, 2620 and 2630 comprise linear amplifiers with fixed gain such that the excitation produced at terminals 2514 and 2516 follow input 2512 in a proportional fashion.

The loop signal appearing across the loop test terminals 2514 and 2516 is sensed by difference amplifier 2580 comprised of operational amplifiers 2640, 2650 and 2670, according to known techniques. Operational amplifier 2670 drives output 2518 through variable resistor $R_{2680}$. Difference amplifier also includes resistors $R_{2642}$, $R_{2652}$ and variable resistor $R_{2645}$ which determine the difference amplifier's gain. According to one embodiment, $R_{2642}$ and $R_{2652}$ have equal values and $R_{2680}=0$, in which case the difference amplifier response is $$V(518) = (V(514) - V(516)) \cdot \left(1 + \frac{2R_{2642}}{R_{2645}}\right)$$

Resistors $R_{2645}$ and $R_{2680}$ can have fixed preset values. In another embodiment, the values of resistors $R_{2645}$ and $R_{2680}$ may be changed at different intervals following application of a pulse at input 2512. This permits attenuation of the initial excitation pulse and amplification of small reflections appearing later.

Figure 24A:
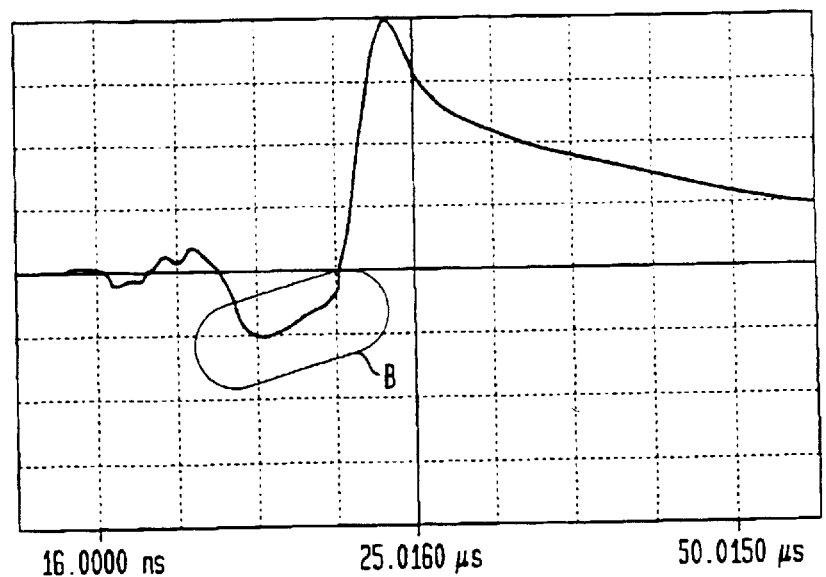
FIG. 24A depicts data acquired on a loop using the measurement setup of FIG. 22 in accordance with an aspect the present invention.
Figure 24B:
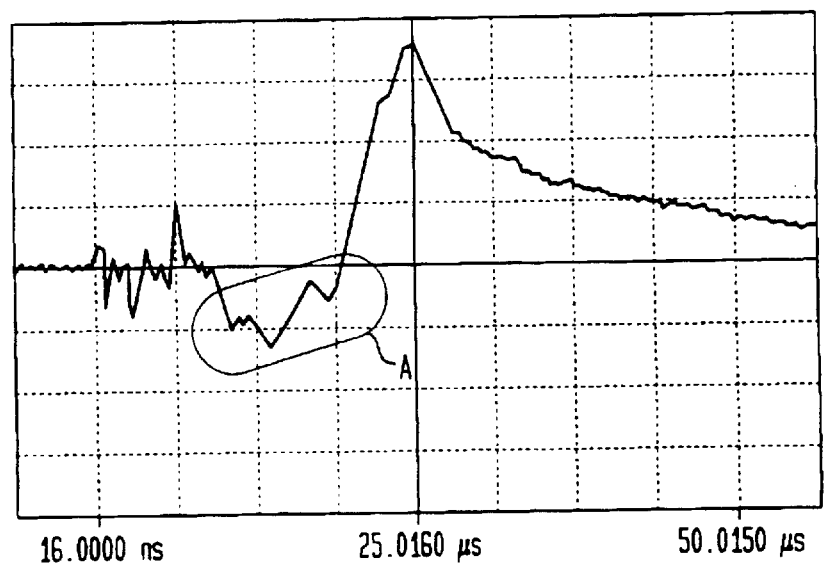
FIG. 24B depicts data acquired on the same loop of FIG. 24A using prior art circuitry.

The improvements of the circuitry of the present invention may be better appreciated by way of reference to FIG. 24. FIG. 24A depicts an echo response of a gauge change (3200 feet of AWG 26 cable followed by 3200 feet of AWG 24 cable) in accordance with the embodiment of FIG. 22. FIG. 24B depicts the echo response of the same gauge change without our common mode rejection circuitry, i.e., using the setup of FIG. 20. In FIG. 24B the region noted as A has many peaks, whereas in FIG. 24A the same region B is shown as having one peak. Accordingly, our common rejection circuitry acquires a better signal for processing since the additional peaks are suggestive of other discontinuities other than a gauge change.

Accordingly, for the purpose of identifying the make-up of a loop, better results will be achieved if the circuitry is used in accordance with the teachings of section 1.

3. Loop Make-Up Identification on a Real Loop

In this section, an example of our identification method will be given. In particular, starting from data measured on an unknown loop, an example on how to perform identification following the steps described in the flow-chart of FIG. 17B will be given. No a priori information on the loop will be assumed, except for some basic constraints on the location of discontinuities. These constraints derive from the fact that a probing pulse of 5 Volts (differential) is used, and this limits the range of identifiable loops. In particular, a set of preliminary experiments allowed us to state that, in principle, any topology that satisfies the following constraints can be unambiguously identified if a 5 Volts (differential) pulse were used: (1) Maximum loop length less than 9 kft; (2) Gauge changes located within 5 kft; (3) Bridged taps located within 6 kft;

Obviously, if a stronger pulse were used or some sort of amplification were introduced at the receiver these limits would be higher. In particular, it has been calculated that a minimum amplification of a factor of 50 would be necessary to locate accurately any discontinuity located within 18 kft.

Figure 25:
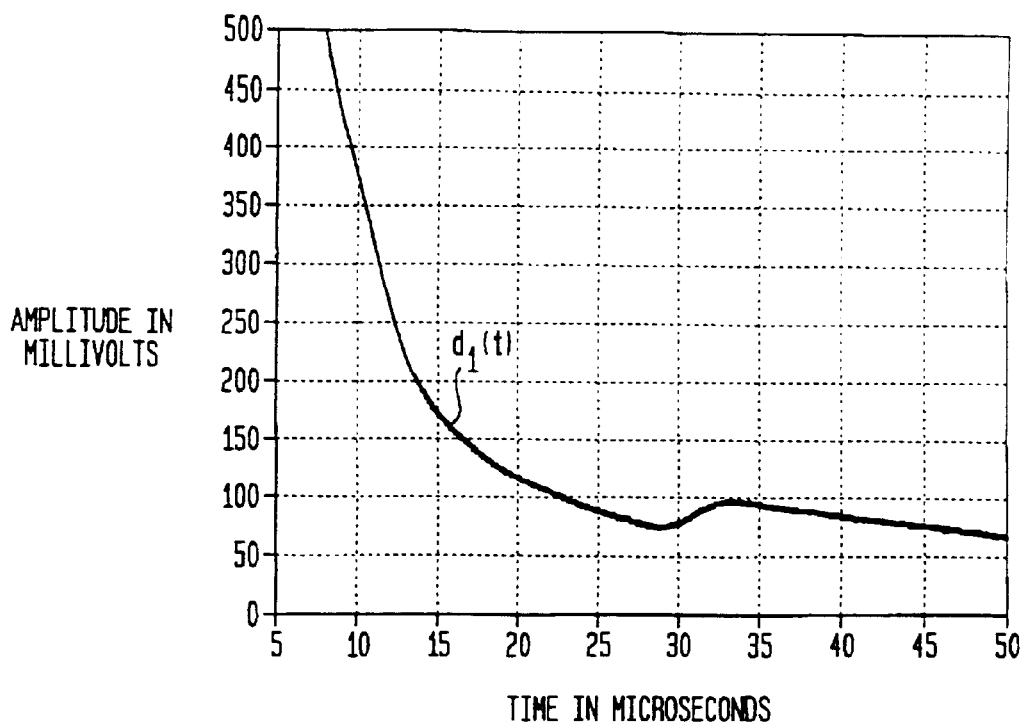
FIG. 25 depicts data acquired, $d_1(t)$, on a real loop using a 3 $\mu$s probing pulse.
Figure 26:
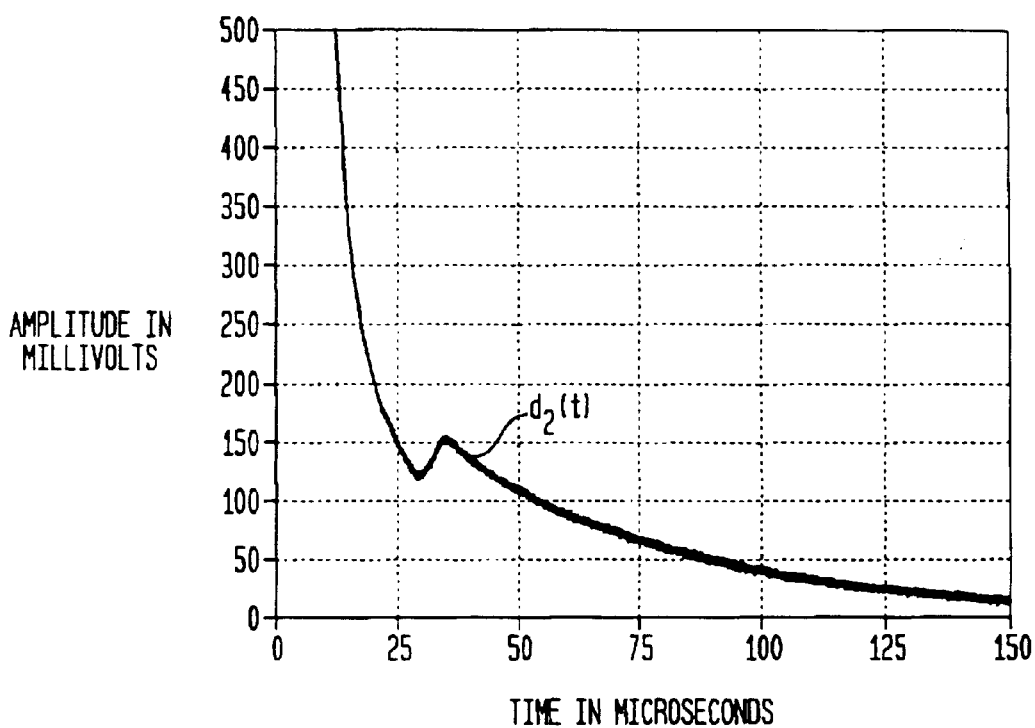
FIG. 26 depicts data acquired, $d_2(t)$, on the same loop using a 5 $\mu$s probing pulse.

Two snapshots of the unknown loop were taken. The first one with a pulse of 3 $\mu$s, and the second one with a pulse of 5 $\mu$s. Following the notation introduced in section 1, these two snapshots are labeled $d_1(t)$ and $d_2(t)$, respectively, and are plotted in FIG. 25 and FIG. 26.

Figure 27:
FIG. 27 depicts the real loop that the data on which FIG. 25 and FIG. 26 was acquired.

The real topology of the loop under investigation is shown in FIG. 27.

Following the flow-chart, $d_1(t)$ is selected as the first data set, or "slice", to use.

INITIAL ITERATION: i=0

At step 1708 or iteration i=0, the gauge of the first loop section has to be detected. This is done by hypothesizing, step 1709, the four topologies $T_1^{(0)}$, $T_2^{(0)}$, $T_3^{(0)}$, and $T_4^{(0)}$, i.e., the topology of a loop that is constituted of a single loop section of gauge X (X=26, 24, 22, 19) and of infinite length.

Figure 28:
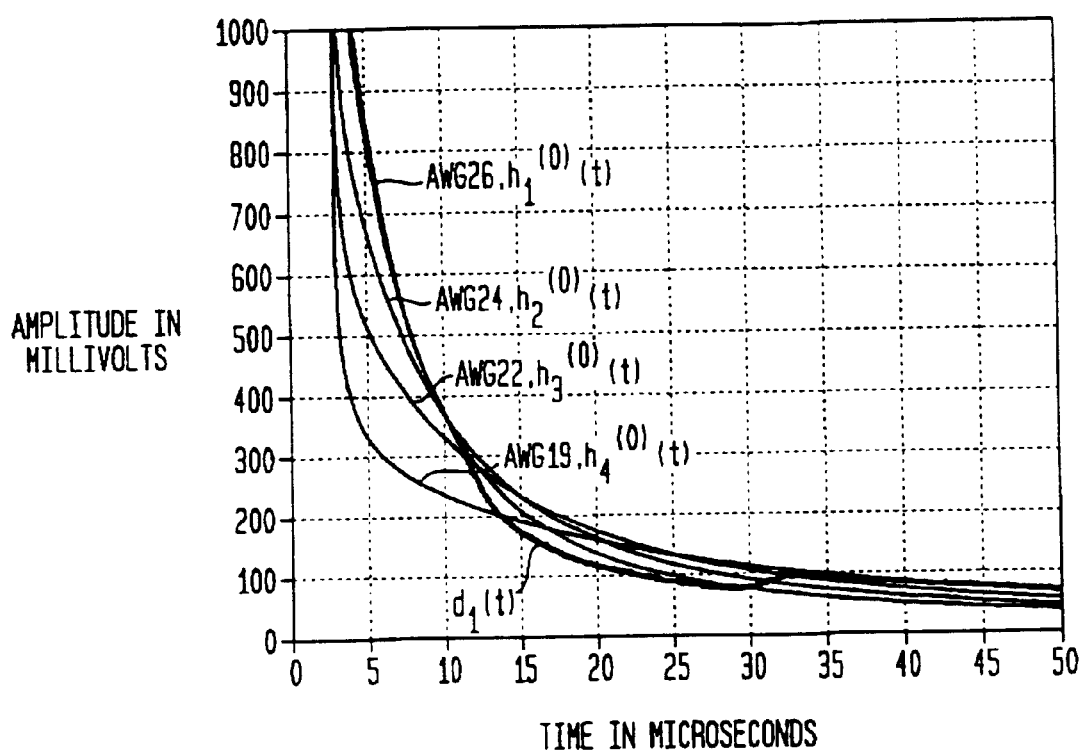
FIG. 28 depicts a plot of $d_1(t)$ and $h_j^{(0)}(t)$ (j=1, ..., 4)

Given the four topologies $T_j^{(0)}$, (j=1, ..., 4), the corresponding four computer generated waveform $h_j^{(0)}(t)$ (j=1, ..., 4) are then computed, step 1711. The plot in FIG. 28 shows $d_1(t)$ and the four waveforms $h_j^{(0)}(t)$ (j=1, ..., 4).

The metric associated with each waveform $h_j^{(0)}(t)$ (j=1, ..., 4), i.e., the MSE between $d_1(t)$ and the waveforms $h_j^{(0)}(t)$ (j=1, ..., 4), is now computed as shown in Table 1. Since the probing pulse was 3 $\mu$s long, the MSE is calculated starting at an instant $t_s$ slightly greater than 3 $\mu$s, e.g. 3.3 $\mu$s. Several ending instants $t_e$ are considered.

TABLE 1

| $t_s = 3.3\ \mu s$ | AWG 26 $h_1^{(0)}(t)$ | AWG 24 $h_2^{(0)}(t)$ | AWG 22 $h_3^{(0)}(t)$ | AWG 19 $h_4^{(0)}(t)$ |
|---|---|---|---|---|
| $t_e = 6\ \mu s$ | $2.91 \cdot 10^{-3}$ | $8.25 \cdot 10^{-2}$ | $2.35 \cdot 10^{-1}$ | $4.74 \cdot 10^{-1}$ |
| $t_e = 9\ \mu s$ | $1.39 \cdot 10^{-3}$ | $3.95 \cdot 10^{-2}$ | $1.22 \cdot 10^{-1}$ | $2.71 \cdot 10^{-1}$ |
| $t_e = 12\ \mu s$ | $8.71 \cdot 10^{-4}$ | $2.46 \cdot 10^{-2}$ | $7.73 \cdot 10^{-2}$ | $1.78 \cdot 10^{-1}$ |
| $t_e = 15\ \mu s$ | $8.55 \cdot 10^{-4}$ | $1.84 \cdot 10^{-2}$ | $5.64 \cdot 10^{-2}$ | $1.30 \cdot 10^{-1}$ |

Figure 29:
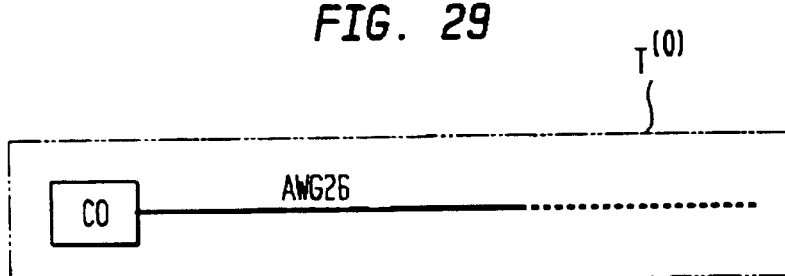
FIG. 29 topology $T^{(0)}$ identified in accordance with the method steps of an aspect of the present invention.

The MSE pertaining to the waveform $h_1^{(0)}(t)$ is always the lowest, so that the chosen, step 1712, topology is $T_1^{(0)}$, i.e. the gauge of the first loop section is an AWG 26. Therefore, we pose $T^{(0)}=T_1^{(0)}$ and $h^{(0)}(t)=h_1^{(0)}(t)$. FIG. 29 shows the identified topology $T^{(0)}$ after the initial iteration, i.e., i=0.

NEXT ITERATION i=1

Figure 30:
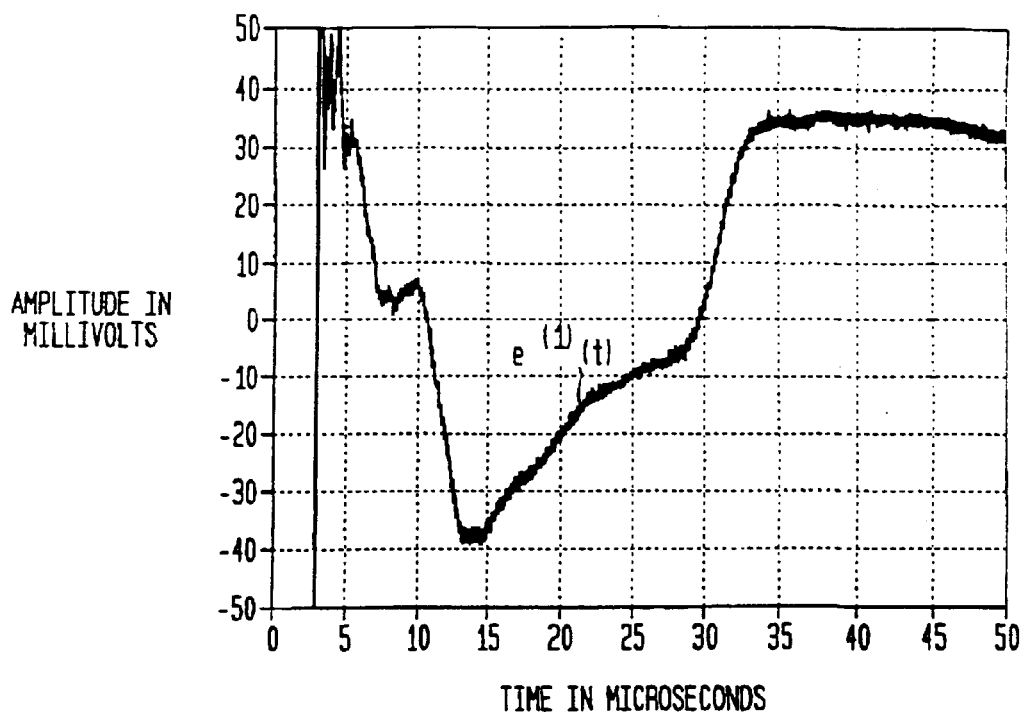
FIG. 30 is a plot of $e_1(t)=d_1(t)-h^{(0)}(t)$ in accordance with an aspect of the present invention.

The difference $e^{(1)}(t)=d_1(t)-h^{(0)}(t)$ is computed, step 1713, and the result is plotted in FIG. 30. An echo exists so its rough time of arrival is estimated, step 1714, with any method, for example the derivative. The estimate of the time of arrival $\tau^{(1)}$ of the first echo in $e^{(1)}(t)$ is 10.7 $\mu$s. The location of the discontinuity that generated that echo is at 3.6 kft from the CO as previously discussed.

The topologies that can be hypothesized, step 1715, depend on the sign of the echo and on the previously identified discontinuities. The possible loop topologies look like the ones in FIG. 31. Since there are several possible topologies, it would be inconvenient to calculate all of the possible waveforms and their metrics. So, as suggested in section 1, for each family of discontinuities only the two most distant waveforms of the family will be computed. The six topologies that are initially considered are shown in FIG. 32.

Figure 32:
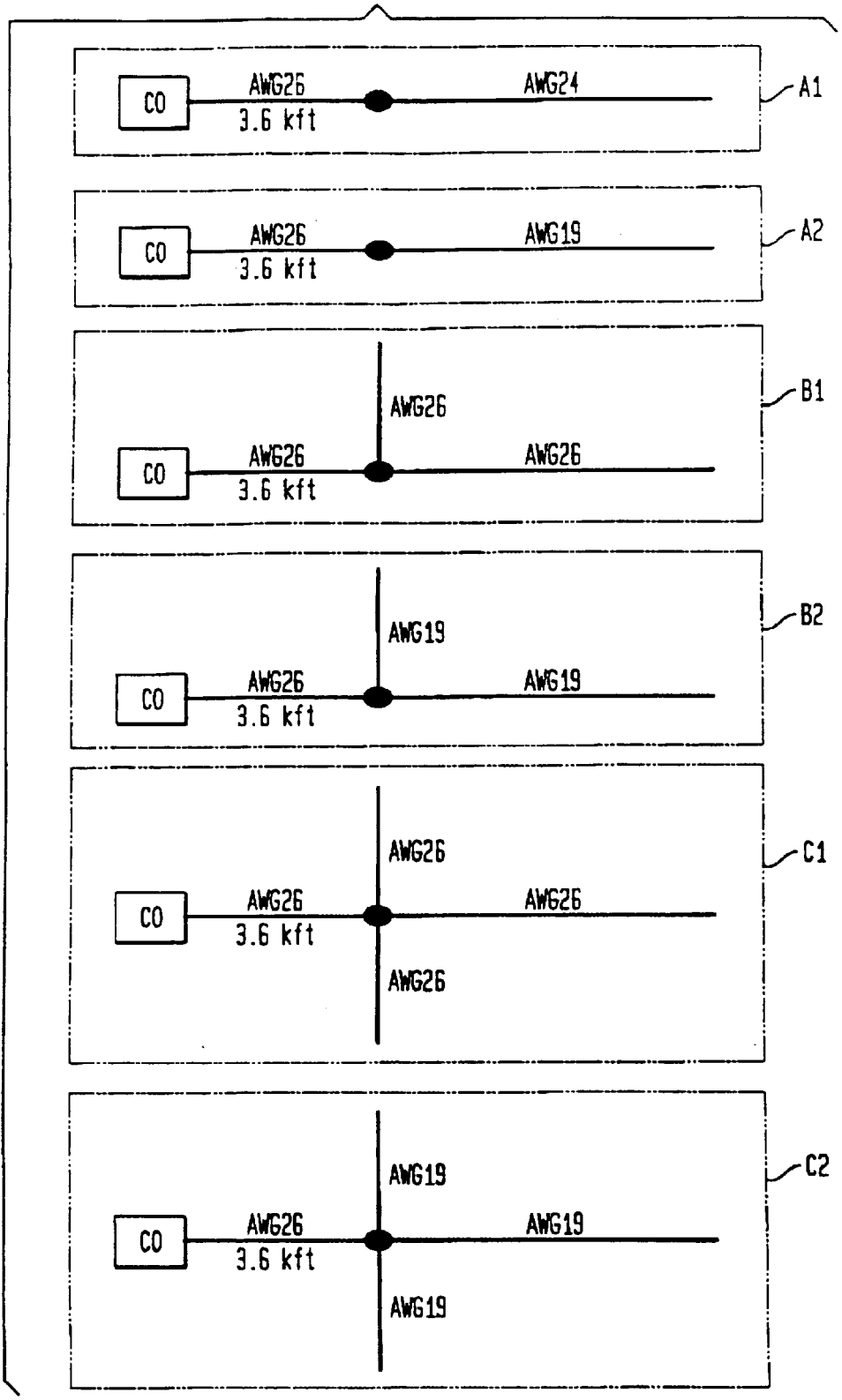
FIG. 32 depicts the hypothesized topologies $h_j^{(1)}(t)$ (j=1, ..., 6) at step i=1.
Figure 33:
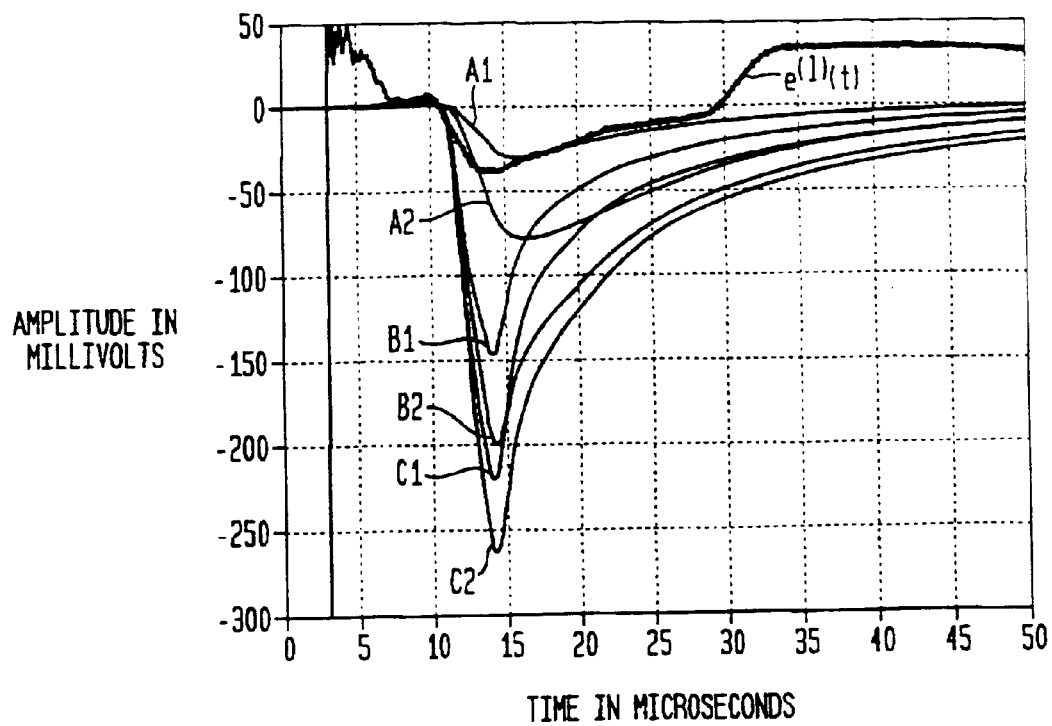
FIG. 33 is a plot of $e_1(t)$ and $[h_j^{(1)}(t)-h^{(0)}(t)]$ (j=1, ..., 6)

FIG. 33 shows the waveform $e^{(1)}(t)$ and the computer generated waveforms, step 1717 of all six cases shown in FIG. 32. Since the first echo was at 10.7 $\mu$s, the MSE between $e_1(t)$ and $[h_j^{(1)}(t)-h^{(0)}(t)]$ (j=1, ..., 6) is calculated, step 1731, starting at that instant. Several ending instants $t_e$ are considered as indicated in Table 2.

TABLE 2

| $t_s = 10.7\ \mu s$ | A1 | A2 | B1 | B2 | C1 | C2 |
|---|---|---|---|---|---|---|
| $t_e = 14\ \mu s$ | $3.03 \cdot 10^{-4}$ | $8.25 \cdot 10^{-5}$ | $3.90 \cdot 10^{-3}$ | $7.34 \cdot 10^{-3}$ | $1.14 \cdot 10^{-2}$ | $1.59 \cdot 10^{-2}$ |
| $t_e = 17\ \mu s$ | $2.18 \cdot 10^{-4}$ | $5.35 \cdot 10^{-4}$ | $5.18 \cdot 10^{-3}$ | $1.25 \cdot 10^{-2}$ | $1.52 \cdot 10^{-2}$ | $2.42 \cdot 10^{-2}$ |
| $t_e = 20\ \mu s$ | $1.58 \cdot 10^{-4}$ | $1.03 \cdot 10^{-3}$ | $4.27 \cdot 10^{-3}$ | $1.22 \cdot 10^{-2}$ | $1.27 \cdot 10^{-2}$ | $2.23 \cdot 10^{-2}$ |
| $t_e = 23\ \mu s$ | $1.25 \cdot 10^{-4}$ | $1.33 \cdot 10^{-3}$ | $3.57 \cdot 10^{-3}$ | $1.14 \cdot 10^{-2}$ | $1.08 \cdot 10^{-2}$ | $2.00 \cdot 10^{-2}$ |

Figure 31:
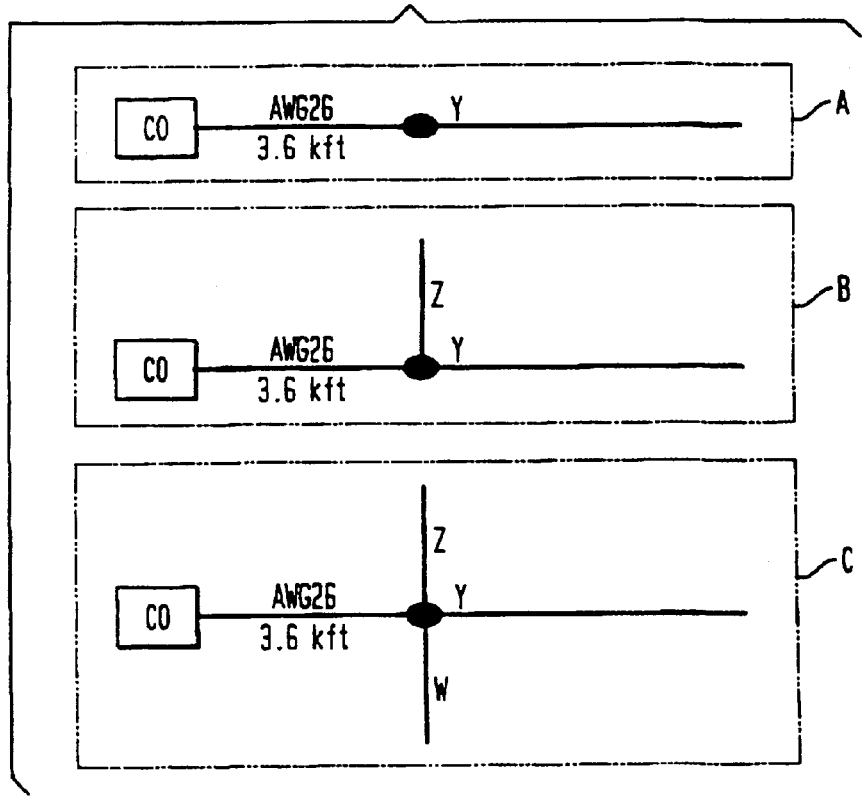
FIG. 31 depicts the families of hypothesized topologies at step i=1.

The minimum of the MSE is achieved more often and consecutively in the case A1 than in any other case, therefore it is concluded that the real topology of the loop must belong to the family (A) shown in FIG. 31, i.e., it is a gauge change. It is worth pointing out that the check on the peaks of (A1) and $e^{(1)}(t)$ shows a difference around 20%, a very high value. However, in the case of gauge changes, the check on the peak should be performed after the fine-tuning, step 1740, of the estimate of the time of arrival $\tau^{(1)}$ as previously mentioned.

Figure 34:
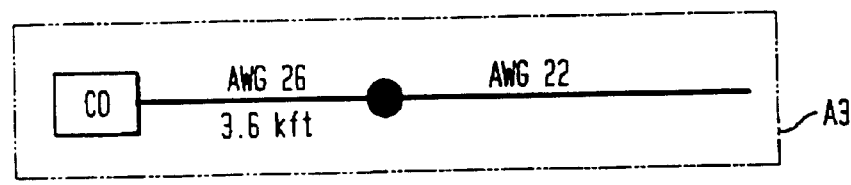
FIG. 34 depicts additional hypothesized topology $T_{a3}^{(1)}$ at step i=1.
Figure 35:
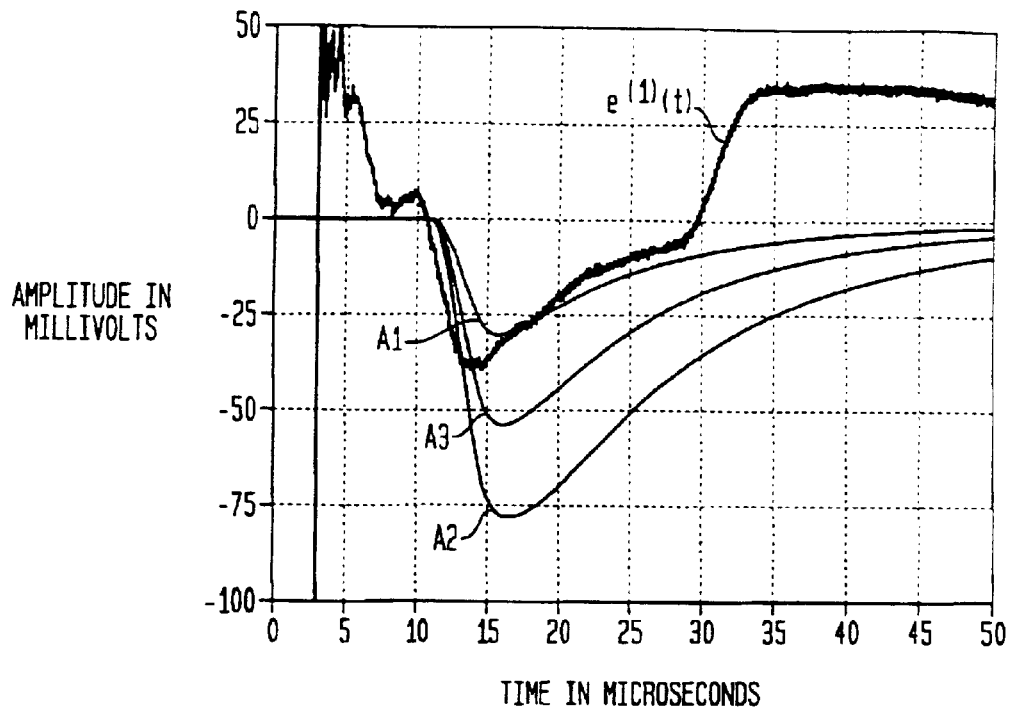
FIG. 35 is a plot of $e_1(t)$ and $h_j^{(1)}(t)$ (j=A1, A2, A3)

The possible topologies for gauge changes are only three so an additional topology is hypothesized, a gauge change with a 22 gauge as shown in FIG. 34. The waveform $e^{(1)}(t)$ and the computer generated waveforms of all the possible gauge changes cases are shown in FIG. 35. The MSE of the hypothesized topologies (A1), (A2), (A3) of FIG. 32 and FIG. 34 is shown below in Table 3.

TABLE 3

| $t_s = 10.7\ \mu s$ | A1 | A2 | A3 |
| --- | --- | --- | --- |
| $t_e = 14\ \mu s$ | $3.03 \cdot 10^{-4}$ | $8.25 \cdot 10^{-5}$ | $1.29 \cdot 10^{-4}$ |
| $t_e = 17\ \mu s$ | $2.18 \cdot 10^{-4}$ | $5.35 \cdot 10^{-4}$ | $1.60 \cdot 10^{-4}$ |
| $t_e = 20\ \mu s$ | $1.58 \cdot 10^{-4}$ | $1.03 \cdot 10^{-3}$ | $2.65 \cdot 10^{-4}$ |
| $t_e = 23\ \mu s$ | $1.25 \cdot 10^{-4}$ | $1.33 \cdot 10^{-3}$ | $3.27 \cdot 10^{-4}$ |

For several time intervals, the minimum MSE is achieved in all three cases so that the choice of the right topology might not be immediate. Although in the last intervals the minimum MSE is achieved by (A1), in these situations it is better to double check with the amplitude of the peaks. The percentage differences of the peaks in cases (A1), (A2), and (A3) with respect to the peak of $e^{(1)}(t)$, are −21%, +105%, and +42%. Certainly, the peak of (A1) is the closest to the one of $e^{(1)}(t)$.

Therefore, the chosen discontinuity, i.e. $T^{(1)}$, is the one labeled A1 in FIG. 35; the computer generated waveform that corresponds to $T^{(1)}$ is $h^{(1)}(t)$.

Figure 36:
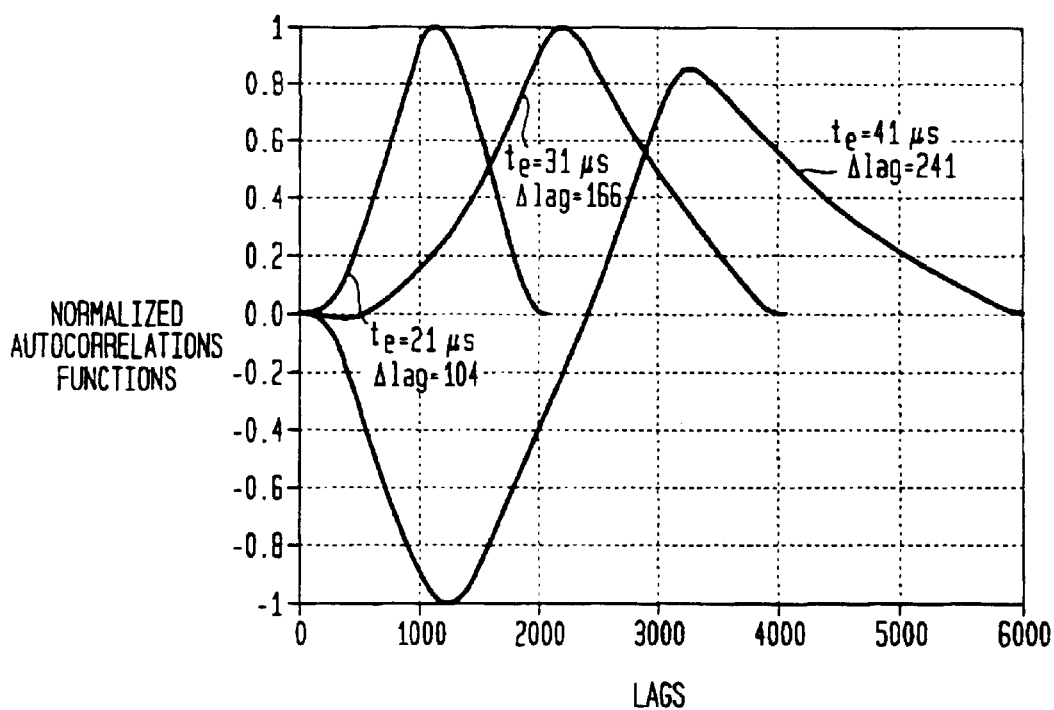
FIG. 36 depict cross-correlation functions between $e^{(1)}(t)$ and $[h^{(1)}(t)-h^{(0)}(t)]$.

Once the topology has been chosen, a fine tuning, step 1740, of the estimate of the time of arrival $\tau^{(1)}$ should be performed. This is accomplished by performing a cross-correlation between $e^{(1)}(t)$ and the difference $[h^{(1)}(t)-h^{(0)}(t)]$. A set of cross-correlation functions for different time intervals should be considered. This is shown in FIG. 36. An analysis of these functions shows that the maximum of the cross-correlation functions occurs first at +104, then at +166 and finally at +241 lags further from the central lag. The first two cross-correlations are symmetric whereas the skewness of the third function is very high, so that the value that is chosen is $\Delta_{lag}=+166$. This means that there is an error of approximately 550 feet in excess in the first estimation of the location of the discontinuity.

Figure 37:
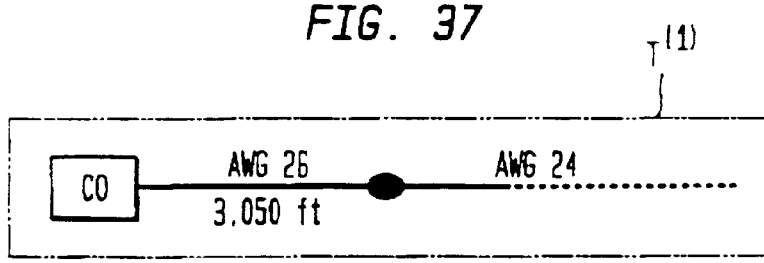
FIG. 37 depicts hypothesized topology $T^{(1)}$ at then end of step i=1.
Figure 38:
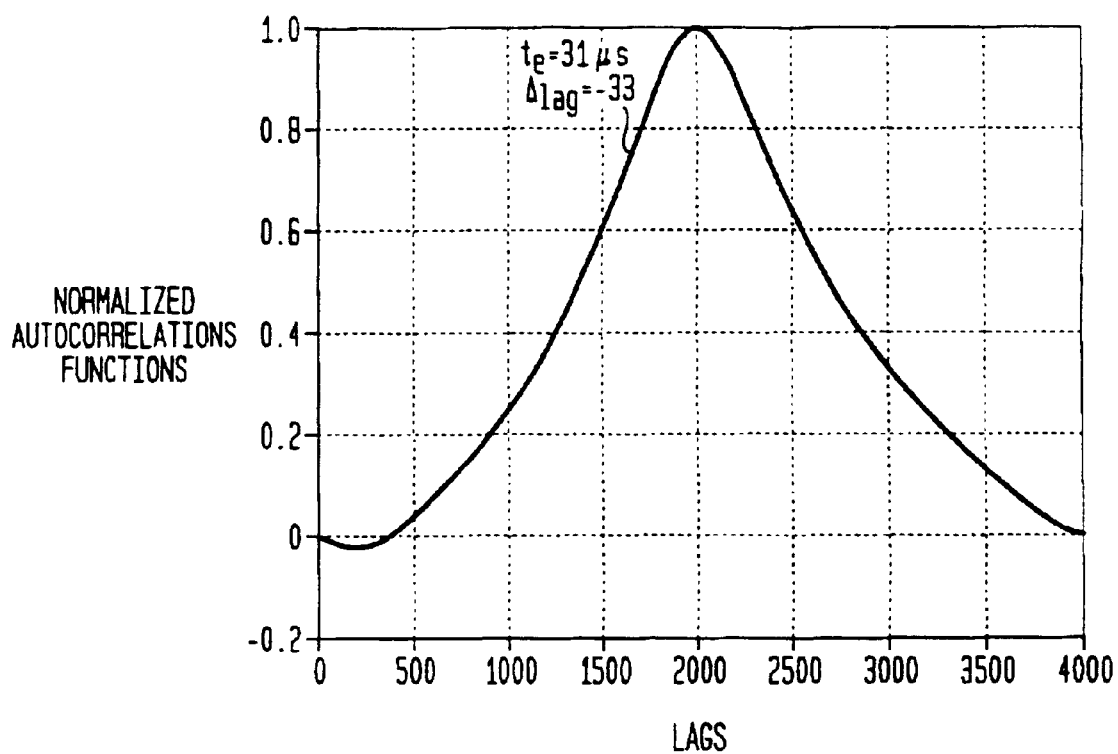
FIG. 38 depicts the cross-correlation function between $e^{(1)}(t)$ and $[h^{(1)}(t)-h^{(0)}(t)]$.

The updated topology $T^{(1)}$ at the end of step i=1 is shown in FIG. 37 and the corresponding waveform is $h^{(1)}(t)$. The percentage difference between the peak of the computer generated waveform $h^{(1)}(t)$ and the peak of $e^{(1)}(t)$ is now −10%. Although this is an improvement over the previous value of −21%, there is still a high difference. This suggests that another check with the cross-correlation should be performed. The cross-correlation between $e^{(1)}(t)$ and the difference $[h^{(1)}(t)-h^{(0)}(t)]$ (with $h^{(1)}(t)$ updated and referring to FIG. 37) is shown in FIG. 38. The time interval over which it has been computed is the same one that yielded the value $\Delta_{lag}=+166$, i.e. [10.7 $\mu s$, 31 $\mu s$]. The skewness of this function is very low and its maximum occurs at $\Delta_{lag}=-33$. This means that an additional correction of −110 feet is necessary.

Figure 39:
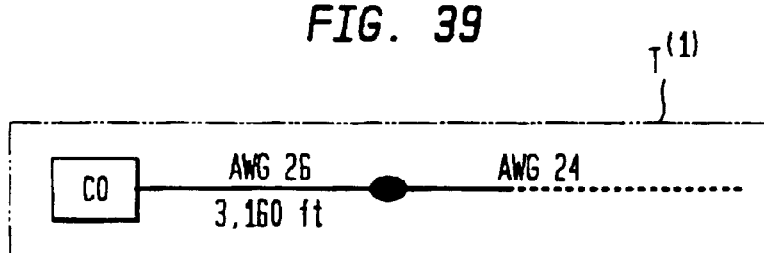
FIG. 39 depicts identified topology $T^{(1)}$ at then end of step i=1.

The updated topology $T^{(1)}$ at the end of step i=1 is shown in FIG. 39 and the corresponding waveform is $h^{(1)}(t)$. The percentage difference between the peak of the computer generated waveform $h^{(1)}(t)$ and the peak of $e^{(1)}(t)$ is now +5.2%. This value may be considered satisfactory, so that no more fine tunings of the time of arrival are performed.

Figure 40:
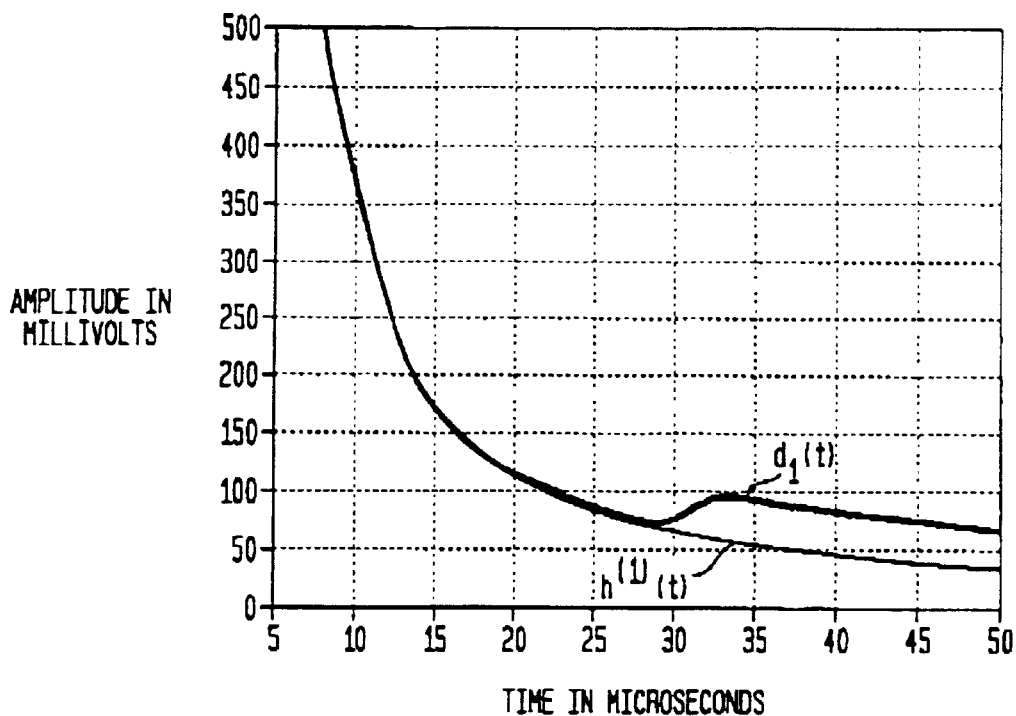
FIG. 40 is a plot of $d_1(t)$ and $h^{(1)}(t)$.

Therefore, the chosen discontinuity at step i=1, i.e. $T^{(1)}$, is the one shown in FIG. 39 and the corresponding computer generated waveform is $h^{(1)}(t)$. The waveform $h^{(1)}(t)$ and the data snapshot $d_1(t)$ are shown in FIG. 40 for comparison purposes.

At this point the process proceeds to the next iteration and in accordance with our notation i=i+1=2.

NEXT ITERATION i=2

Figure 41:
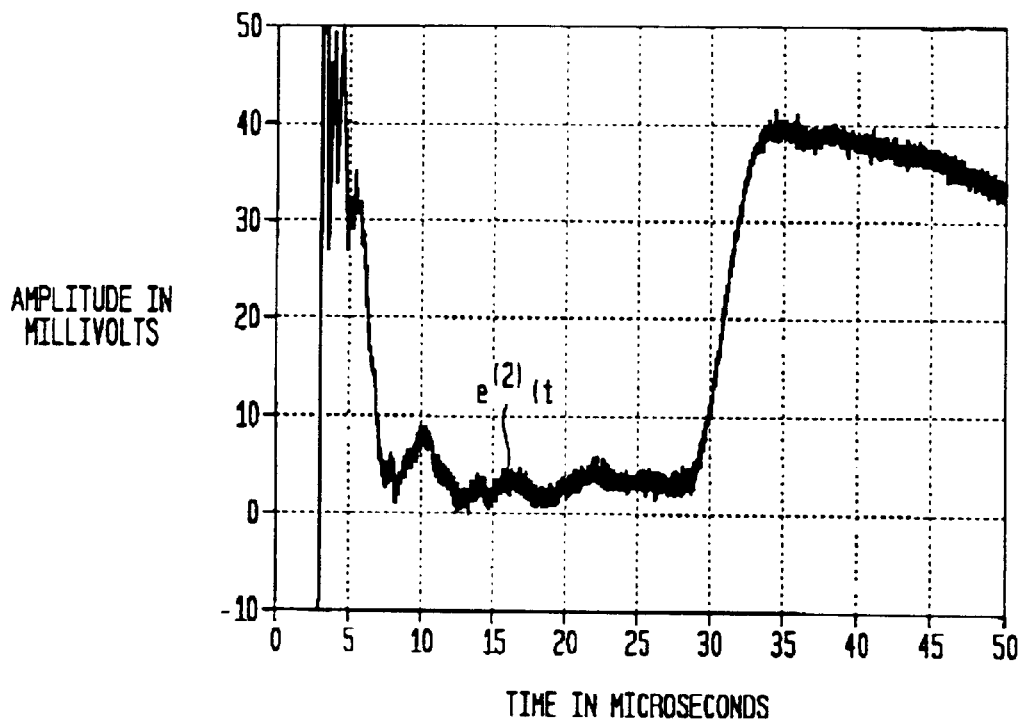
FIG. 41 is a plot of $e^{(2)}(t)$ at the beginning of step i=2.

The difference $e^{(2)}(t)=d_1(t)-h^{(1)}(t)$ is computed, step 1750, and the result in plotted in FIG. 41. The value of $e^{(2)}(t)$ around $\tau^{(1)}$ is less than 10 mV and this confirms that the echo $\tau^{(1)}$ was successfully canceled.

An echo exists in $e^{(2)}(t)$ so its rough time of arrival is estimated, step 1714, with any method, for example the derivative. The estimate of the time of arrival $\tau^{(2)}$ of the first echo in $e^{(2)}(t)$ yields $\tau^{(2)}=29.2\ \mu s$. The discontinuity that generated this echo is located at 9,730 ft from the CO or at 6,570 ft from the last identified discontinuity.

Figure 42A:
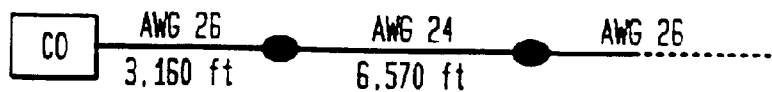
FIG. 42 illustrates possible topologies at the beginning of step i=2.
Figure 42B:

The possible discontinuities that can generate a positive echo in this case are a gauge change or the end of the loop. There are only two possible topologies in this case and they are shown in FIG. 42.

Figure 43:
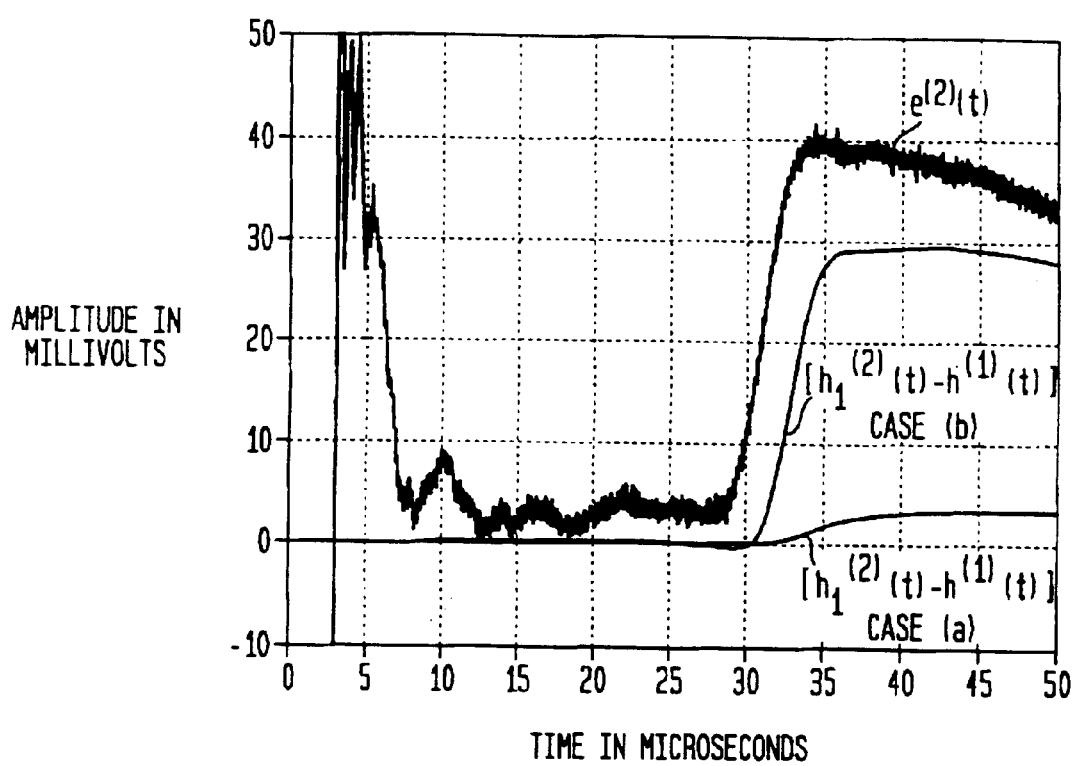
FIG. 43 is a plot of $e^{(2)}(t)$ and $[h_j^{(2)}(t)-h^{(1)}(t)]$ (j=1, 2)

On the basis of the previous considerations, only two waveforms $h_j^{(2)}(t)$ (j=1, 2) are generated. The plots of $e^{(2)}(t)$ and $[h_j^{(2)}(t)-h^{(1)}(t)]$ (j=1, 2) are shown in FIG. 43. Also the MSE between $e^{(2)}(t)$ and $[h_j^{(2)}(t)-h^{(1)}(t)]$ (j=1, . . . , 3) is calculated and reported in Table 4.

TABLE 4

| $t_s = 29.2\ \mu s$ | j=1 (a) | j=2 (b) |
| --- | --- | --- |
| $t_e = 32\ \mu s$ | $5.63 \cdot 10^{-4}$ | $3.50 \cdot 10^{-4}$ |
| $t_e = 35\ \mu s$ | $8.62 \cdot 10^{-4}$ | $3.24 \cdot 10^{-4}$ |
| $t_e = 38\ \mu s$ | $9.90 \cdot 10^{-4}$ | $2.69 \cdot 10^{-4}$ |
| $t_e = 41\ \mu s$ | $1.05 \cdot 10^{-3}$ | $2.33 \cdot 10^{-4}$ |

The MSE for case (B) is always the lowest, therefore it is concluded that $T_2^{(2)}$, i.e. case (B) in FIG. 42, is the most likely topology; the corresponding waveform is now $h^{(2)}(t)=h_2^{(2)}(t)$. The percentage difference of the magnitude of the peaks of $[h_2^{(2)}(t)-h^{(1)}(t)]$ and $e^{(2)}(t)$ (see FIG. 43) is −26%. This value is somewhat high and, hopefully, the fine-tuning of the time of arrival will reduce that value.

Figure 44:
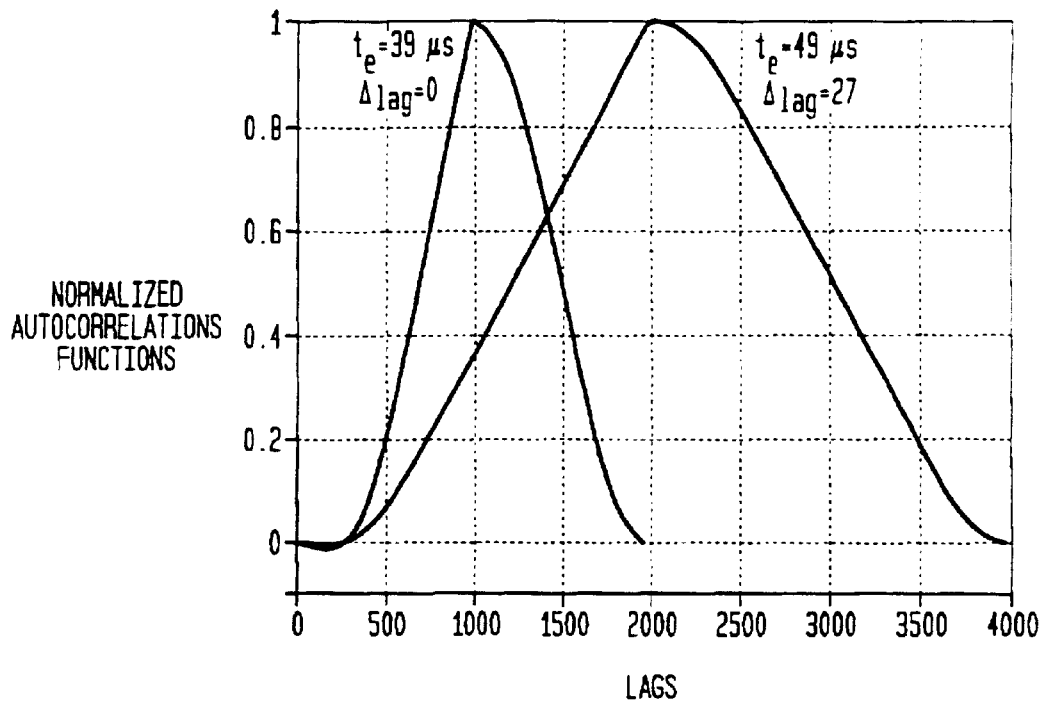
FIG. 44 depict cross-correlation functions between $e^{(2)}(t)$ and $[h^{(2)}(t)-h^{(1)}(t)])]$ using data slice $d_1(t)$.

The fine tuning of the estimation of $\tau^{(2)}$ is accomplished by performing a cross-correlation between $e^{(2)}(t)$ and the difference $h^{(2)}(t)-h^{(1)}(t)$ over several time intervals having $\tau^{(2)}$ as starting instant. A plot of the cross-correlation functions is shown in FIG. 44. Since the cross-correlation functions remain approximately symmetric extending the interval over which they are computed, the fine tuning of the time of arrival $\tau^{(2)}$ can be performed exploiting the last cross-correlation, the one computed on the interval $[\tau^{(2)}, t_e=49\ \mu s]$. An analysis of this function shows that the maximum occurs not at the central lag but at 27 lags further, i.e. there is an error of approximately 90 feet in excess. However, it has to be also noted that this new estimate of $\tau^{(2)}$ may not be accurate because the time interval $[0, 50\ \mu s]$ for $d_1(t)$ is too short for a complete analysis of an echo starting around 30 $\mu s$. This may be confirmed by comparing the value of $e^{(2)}(t)$ at $t=50\ \mu s$ with its peak; in fact, the value of $e^{(2)}(t)$ at the end of the observation time is more than 80% of its peak value, confirming that the echo did not die out, in the observation window. On the basis of the above considerations, it is better start the analysis of the second snapshot that has an observation window of $[0, 150\ \mu s]$.

Figure 45:
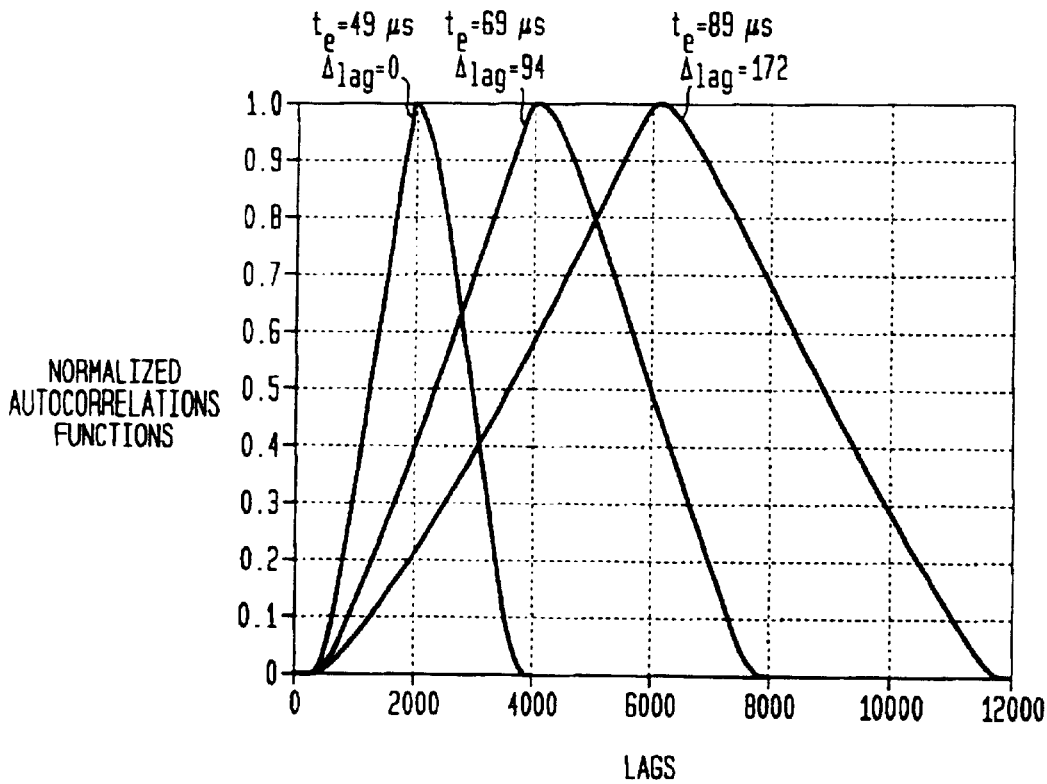
FIG. 45 depict cross-correlation functions between $e^{(2)}(t)$ and $[h^{(2)}(t)-h^{(1)}(t)]$ using new data slice $d_2(t)$.

The cross-correlation between $e^{(2)}(t)$ and the difference $h^{(2)}(t)-h^{(1)}(t)$ is now recomputed using the second data slice $d_2(t)$ over several time intervals having $\tau^{(2)}$ as the starting instant. A plot of the cross-correlation functions is shown in FIG. 45. Since the cross-correlation functions remain approximately symmetric extending the interval over which they are computed, the fine tuning of the time of arrival $\tau^{(2)}$ can be performed exploiting the last cross-correlation, the one computed on the interval $[\tau^{(2)}, t_e=89\ \mu s]$. An analysis of this function shows that the maximum occurs not at the central lag but at 172 lags further, i.e. there is an error of approximately 570 feet in excess.

Figure 46:
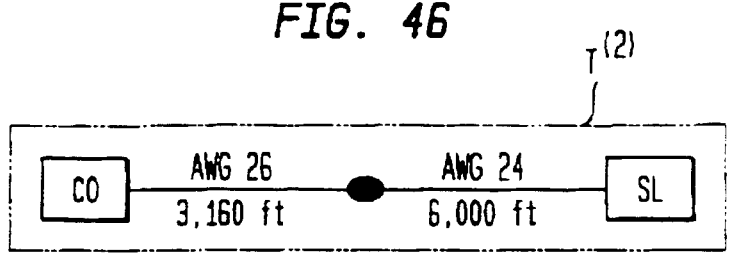
FIG. 46 depicts a chosen topology at the end of step i=2.

The updated topology $T^{(2)}$ at the end of step i=2 is shown in FIG. 46 and the corresponding waveform is $h^{(2)}(t)$. The percentage difference between the peak of the computer generated waveform $h^{(1)}(t)$ and the peak of $e^{(1)}(t)$ is now +5.2%. This value may be considered satisfactory, so that no more fine tunings of the time of arrival are performed.

At this point the algorithm proceeds to step i=i+1=3, analyzing the data slice $d_2(t)$.

ITERATION WITH i=3

Figure 47:
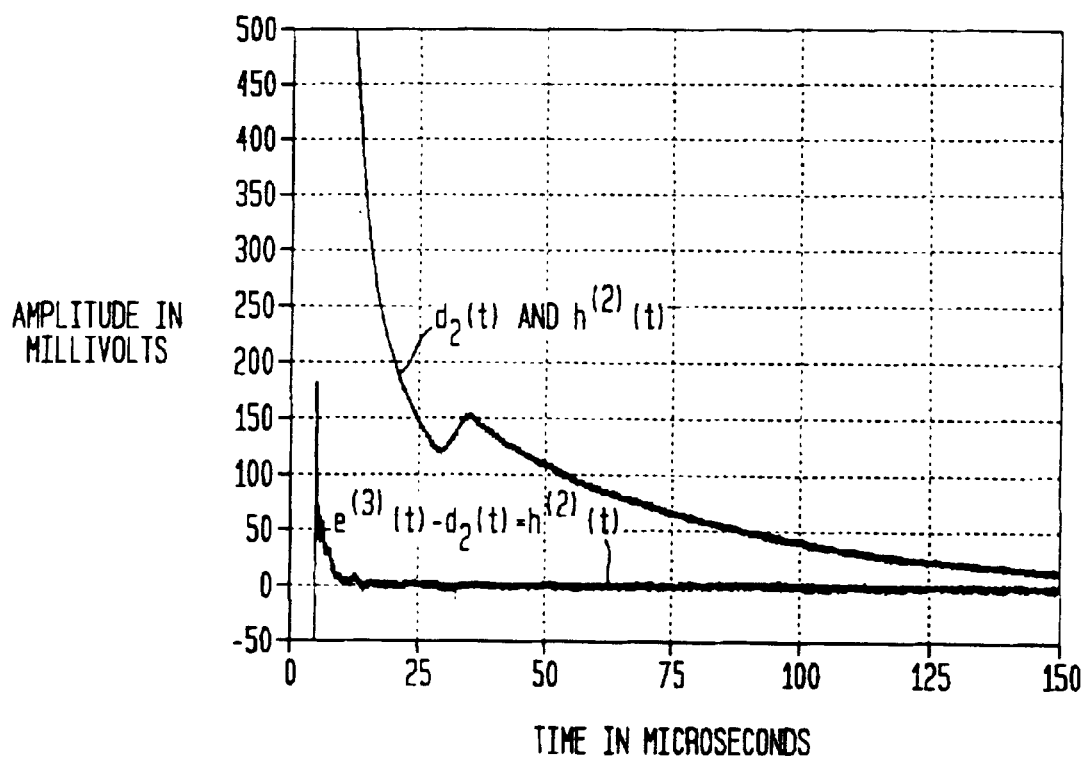
FIG. 47 is a plot of $d_2(t)$, $h^{(2)}(t)$, and their difference $e^{(3)}(t)$.

The difference $e^{(3)}(t)=[d_2(t)-h^{(2)}(t)]$ is plotted in FIG. 47. The maximum of the signal $e^{(3)}(t)$ in the interval $[\tau^{(1)}, 150\ \mu s]$ is 10.8 mV, while its energy is $2.9\cdot 10^{-6}$. These low values suggest that no echo is present and that it is necessary to analyze the next data slice. However, since the longest data slices was already analyzed it is concluded that the end of the loop was reached.

As the above makes clear our method to identify the make-up of loop by processing echoes that result from probing the medium with pulses. The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated.

I claim:

1. A method for identifying the makeup of a subscriber loop including a cable having discontinuities thereon, said method comprising the steps of:

transmitting a probing pulse on the loop and acquiring data based on receiving echoes there from caused by the discontinuities on the loop;

hypothesizing a representative set of topologies of the loop based on the acquired data resulting from the discontinuities;

computing a corresponding waveform for each of the hypothesized topologies;

comparing each computed corresponding waveform to the acquired data and choosing the topology whose corresponding waveform best matches the acquired data;

subtracting the waveform corresponding to the chosen topology from the acquired data to produce compensated data;

finding a next echo present in the compensated data;

iteratively repeating said hypothesizing, computing, comparing, subtracting, and finding steps for each discontinuity of the loop until no echoes are found; and identifying the presence or absence and location of one or more gauge changes and bridged taps, the length of the loop including the length of each bridged tap, and the gauge of each loop section.

2. The method of claim 1 wherein said step of transmitting a probing pulse on the loop and acquiring data comprises transmitting on the loop a plurality of pulses and averaging said acquired data.

3. The method of claim 2 wherein said step of transmitting a plurality of pulses comprises transmitting groups of pulses of different duration and amplitude to obtain several snapshots of the loop.

4. The method of claim 1 wherein said step of hypothesizing a representative set of topologies of the loop comprises exploiting a priori knowledge of the statistical distribution of loop sections or a priori knowledge obtained by analyzing loop records in a database.

5. The method of claim 1 wherein said step of finding the next echo present in said compensated data includes estimating the time of arrival of said next echo so as to determine the location l of the discontinuity that generated said next echo as $l=\frac{1}{2}v\cdot\tau$, where $\tau$ represents said estimated time of arrival and v is the echo propagation velocity.

6. A method for determining the make up of a subscriber loop including a cable having discontinuities thereon, said method comprising the steps of:

transmitting a pulse on the loop and acquiring data based on receiving echoes caused by the discontinuities on the loop;

hypothesizing a representative set of topologies of the loop based on the acquired data and comprising considering loop sections of unknown length as loop sections of infinite length;

computing a corresponding waveform for each of the hypothesized topologies;

comparing each computed corresponding waveform to the acquired data to choose the topology whose corresponding waveform best matches the acquired data;

subtracting the waveform corresponding to the chosen topology from the acquired data to produce compensated data;

finding a next echo present in said compensated data;

iteratively repeating said hypothesizing, computing, comparing, subtracting, and finding steps for each discontinuity of the loop until no more echoes are found, and determining the make up of the subscriber loop based on said iterative repetitions.

7. A method for determining the make up of a subscriber loop including a cable having discontinuities thereon, said method comprising the step of:

transmitting a probing pulse on the loop and acquiring data based on receiving echoes there from caused by the discontinuities on the loop;

hypothesizing a representative set of topologies of the loop based on the acquired data, said step of hypothesizing including organizing said topologies in clusters of similar topologies and choosing a reduced set of sample topologies in each of said clusters according to a predetermined criterion;

computing a corresponding waveform for each of the hypothesized topologies, said step of computing comprising computing waveforms for each of the topologies in each of said clusters;

comparing a corresponding wave form for each of the hypothesized topologies, said step of comparing comprising comparing said computed corresponding waveforms for the sample topologies in the reduced set to the acquired data to choose the sample topology whose corresponding waveform best matches the acquired data;

subtracting the chosen corresponding waveform from the acquired data to produce compensated data;

finding a next echo present in said compensated data;

iteratively repeating said hypothesizing, computing, comparing, subtracting, and finding steps for each discontinuity of the loop until no more echoes are found; and determining the make up of the subscriber loop based on said iterative repetitions.

8. The method of claim 7 further comprising the steps of:

computing corresponding waveforms for each of the topologies belonging to the cluster which contains said chosen topology, and comparing the computed corresponding waveforms for each of the topologies belonging to the cluster, which contains said chosen topology to the acquired data to choose the topology whose corresponding waveform best matches the acquired data.

9. A method for determining the make up of a subscriber loop including a cable having discontinuities thereon, said method comprising the steps of:

transmitting a probing pulse on the loop and acquiring data based on receiving echoes there from caused by the discontinuities on the loop;

said step of computing a corresponding waveform for each of the hypothesized topologies comprises comprising calculating a loop input impedance in the frequency domain for each of the hypothesized topologies, computing in the frequency domain the signal actually entering the loop in accordance with equation (3), and transforming said signal to produce the corresponding waveform in the time domain;

comparing each computed corresponding waveform to the acquired data to choose the topology whose corresponding waveform best matches the acquired data;

subtracting the chosen waveform form corresponding to the chosen topology from the acquired data to produce compensated data;

finding a next echo present in the compensated data;

iteratively repeating said hypothesizing computing, comparing, subtracting, and finding steps for each discontinuity of the loop until no more echoes are found; and determining the make up of the subscriber loop based on said iterative repetitions.

10. A method for enhancing the range and accuracy of a TDR, said method comprising the steps of:

transmitting a probing pulse on a cable loop and acquiring data based on received echoes there from caused by discontinuities on the loop;

determining a slowly decaying signal superimposed to the echoes caused by the discontinuities on the loop, said determining step comprising the steps of computing the slowly decaying signals pertaining to all gauges of interest in the frequency domain in accordance with equation (4);

transforming said slowly decaying signal in the frequency domain to obtain the waveforms of the slowly decaying signals pertaining to all gauges of interest in the time domain; and comparing said slowly decaying signals with the acquired data and choosing the slowly decaying signal that best matches the acquired data;

subtracting said chosen slowly decaying signal from the acquired data to produce compensated data; and analyzing said compensated data for detecting the discontinuities on the loop.

11. The method of claim 10 wherein said step of transmitting a probing pulse on the loop and acquiring data comprises transmitting on the loop a plurality of pulses and averaging said acquired data.

12. The method of claim 11 wherein said step of transmitting a plurality of pulses comprises transmitting groups of pulses of different duration and amplitude to obtain several snapshots of the loop.

13. A method for detecting impedance discontinuities on a cable loop said method comprising the steps of:

transmitting a probing pulse on the loop and acquiring data based on receiving echoes there from caused by discontinuities on the loop, determining a slowly decaying signal superimposed to the echoes caused by the discontinuities on the loop, said step of determining a slowly decaying signal including the steps of probing a substantially long loop having a single section of a certain gauge to obtain a measured slowly decaying signal pertaining to said gauge, storing in a memory a sample of said slowly decaying signal, and iteratively repeating said steps of probing and storing until slowly decaying signals pertaining to all gauges of interest are measured;

subtracting said chosen slowly decaying signal from the acquired data to produce compensated data; and analyzing said compensated data for detecting the discontinuities on the loop.

14. A method for analyzing discontinuities on a cable loop comprising:

caused transmitting a pulse on the loop and acquiring data based on received echoes there from caused by the discontinuities on the loop; and identifying the discontinuities and subtracting waveforms, which are a function of a currently identified discontinuity and previously identified loop sections from the acquired data one at a time in sequential fashion.

15. The method of claim 14 wherein said step of transmitting a probing pulse on the loop and acquiring data comprises transmitting on the loop a plurality of pulses and averaging said acquired data.

16. The method of claim 14 wherein said step of transmitting a plurality of pulses comprises transmitting groups of pulses of different duration and amplitude to obtain several snapshots of the loop.

* * * * *

UNITED STATES PATENT AND TRADEMARK OFFICE
CERTIFICATE OF CORRECTION

PATENT NO. : 6,724,859 B1  Page 1 of 1
DATED : April 20, 2004
INVENTOR(S) : Stefano Galli It is certified that error appears in the above-identified patent and that said Letters Patent is hereby corrected as shown below:

Column 30,
Line 38, before "transmitting" delete "caused"

Signed and Sealed this

Twentieth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,724,859 B1
DATED : April 20, 2004
INVENTOR(S) : Stefano Galli

It is certified that error appears in the above-identified patent and that said Letters Patent is hereby corrected as shown below:

<u>Column 27,</u>
Lines 65 and 66, delete "priori" and insert -- prior --.

<u>Column 29,</u>
Line 16, delete "said step of".
Line 17, after "each of the hypothesized topologies" delete "comprises".

Signed and Sealed this

Twenty-seventh Day of September, 2005

JON W. DUDAS
*Director of the United States Patent and Trademark Office*

UNITED STATES PATENT AND TRADEMARK OFFICE
CERTIFICATE OF CORRECTION

PATENT NO. : 6,724,859 B1
DATED : April 20, 2004
INVENTOR(S) : Stefano Galli

It is certified that error appears in the above-identified patent and that said Letters Patent is hereby corrected as shown below:

Column 27,
Lines 65 and 66, delete "priori" and insert -- prior --.

Column 29,
Line 16, delete "said step of".
Line 17, after "each of the hypothesized topologies" delete "comprises".

Signed and Sealed this

Twenty-eighth Day of February, 2006

JON W. DUDAS
*Director of the United States Patent and Trademark Office*